United States Patent
Xia et al.

(10) Patent No.: US 9,998,319 B2
(45) Date of Patent: Jun. 12, 2018

(54) CONTROL INFORMATION TRANSMISSION METHOD AND SENDING AND RECEIVING DEVICE

(71) Applicant: ZTE CORPORATION, Shenzhen, Guangdong Province (CN)

(72) Inventors: Shuqiang Xia, Shenzhen (CN); Jing Shi, Shenzhen (CN); Jin Xu, Shenzhen (CN); Jun Xu, Shenzhen (CN); Peng Hao, Shenzhen (CN); Chunli Liang, Shenzhen (CN); Bo Dai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 59 days.

(21) Appl. No.: 14/890,931

(22) PCT Filed: Feb. 24, 2014

(86) PCT No.: PCT/CN2014/000171
§ 371 (c)(1),
(2) Date: Nov. 13, 2015

(87) PCT Pub. No.: WO2014/183461
PCT Pub. Date: Nov. 20, 2014

(65) Prior Publication Data
US 2016/0134458 A1    May 12, 2016

(30) Foreign Application Priority Data
May 13, 2013  (CN) .......................... 2013 1 0176200

(51) Int. Cl.
*H04W 72/04*    (2009.01)
*H04L 27/34*    (2006.01)
*H04L 1/18*     (2006.01)
*H04L 5/00*     (2006.01)
*H04L 27/18*    (2006.01)

(52) U.S. Cl.
CPC ........ *H04L 27/3483* (2013.01); *H04L 1/1861* (2013.01); *H04L 5/0053* (2013.01);
(Continued)

(58) Field of Classification Search
CPC .. H04L 27/34; H04L 27/3461–27/3483; H04L 27/2627; H04B 10/613
See application file for complete search history.

(56) References Cited

U.S. PATENT DOCUMENTS 6,611,567 B1 * 8/2003 Balakrishnan .... H04L 25/03834
375/298
8,116,412 B1   2/2012 Jia et al.
(Continued)

FOREIGN PATENT DOCUMENTS

| CN | 101237297 A | 8/2008 |
| CN | 101867439 A | 10/2010 |
| CN | 102904665 A | 1/2013 |

OTHER PUBLICATIONS

"3rd Generation Partnership Project; Technical Specification Group Radio Access Network; Evolved Universal Terrestrial Radio Access (E-UTRA); Physical Channels and Modulation (Release 11)" Dec. 20, 2012, 3GPP TS 36.211 V11.1.0.
(Continued)

*Primary Examiner* — Andrew W Chriss
*Assistant Examiner* — Kenan Cehic
(74) *Attorney, Agent, or Firm* — Plumsea Law Group, LLC

(57) ABSTRACT

Disclosed are a method for transferring control information, a transmitting device and a receiving device, the method includes that: a transmitting end orderly selects an element $y_n$ or two elements $y_{2m-1}$, $y_{2m}$, from a sequence Y to be modulated corresponding to control information B newly added, then it selects pairing elements $x_{2p-1}$, $x_{2p}$ from a
(Continued)

sequence X to be modulated corresponding to related control information A, and groups $y_n$ or $y_{2m-1}$, $y_{2m}$ and the $x_{2p-1}$, $x_{2p}$ into an element group $(x_{2p-1}, x_{2p}, y_n)$ or $(x_{2p-1}, x_{2p}, y_{2m-1}, y_{2m})$ and maps $(x_{2p-1}, x_{2p}, y_n)$ or $(x_{2p-1}, x_{2p}, y_{2m-1}, y_{2m})$ as specified constellation points of a specified constellation diagram, and takes the constellation points as modulation symbols; it takes each two elements in the elements of the sequence X which are not used for pairing as an element group to perform QPSK modulation, modulating into QPSK modulation symbols; and it maps the constellation points and the QPSK modulation symbols to part of or all resources occupied by a corresponding control channel to be transmitted.

20 Claims, 4 Drawing Sheets

(52) U.S. Cl.
CPC ............ *H04L 27/183* (2013.01); *H04L 27/34* (2013.01); *H04L 27/3488* (2013.01); *H04W 72/042* (2013.01)

(56) References Cited

U.S. PATENT DOCUMENTS

| | | |
|---|---|---|
| 2003/0039322 A1* | 2/2003 | Murakami ............... H04L 27/34 375/329 |
| 2007/0092018 A1* | 4/2007 | Fonseka ................ H04L 1/0054 375/265 |
| 2009/0042511 A1 | 2/2009 | Malladi |
| 2009/0232253 A1* | 9/2009 | Letunov .............. H04L 27/3405 375/298 |
| 2011/0013726 A1* | 1/2011 | Voinigescu .............. H03C 1/36 375/298 |
| 2012/0188961 A1* | 7/2012 | Suzuki ............. H04W 74/0833 370/329 |

OTHER PUBLICATIONS

European Search Report dated Mar. 18, 2016 in European Patent Application No. EP14798300.1.
International Search Report and Written Opinion dated May 23, 2014 in PCT Application No. PCT/CN2014/000171.

* cited by examiner

CONTROL INFORMATION TRANSMISSION METHOD AND SENDING AND RECEIVING DEVICE

CROSS-REFERENCE TO RELATED APPLICATION(S)

This application is the U.S. National Phase application of PCT application number PCT/CN2014/000171 having a PCT filing date of Feb. 24, 2014, which claims priority of Chinese patent application 201310176200.8 filed on May 13, 2013, the disclosures of which are hereby incorporated by reference.

TECHNICAL FIELD

The present document relates to the field of communications, and more particularly, to a method for transferring control information, a transmitting device and a receiving device.

BACKGROUND OF RELATED ART

The enhanced physical downlink control channel (ePDCCH) is a important physical layer control channel in the Long Term Evolution (LTE) system of 3rd Generation Partnership Project (3GPP), it is mainly used to bear downlink control information (DCI), and the DCI includes resource allocations and other control information on one or more user equipments (UE). In LTE, uplink and downlink resource scheduling information (e.g., information, such as modulation code scheme (MCS) and resource allocation (RA), etc.), are all born by the PDCCH. Generally, the UE firstly needs to demodulate the DCI in the PDCCH, and then demodulates the physical downlink shared channel (PDSCH) (it includes a broadcast message, paging, and data of the UE, etc.) that belongs to the UE itself in the corresponding resource location. Due to the importance of the DCI, when the ePDCCH is used to transmit the DCI, a more robust modulation scheme is typically adopted, such as quaternary phase shift keying (QPSK), and the like.

Currently, the 3GPP LTE system supports multiple DCI formats, the following gives a brief introduction of DCI formats supported by 3GPP LTE Release-8 (R8):

DCI 0: used for PUSCH scheduling.

DCI 1: used to schedule one PDSCH codeword.

DCI 1A: used for compression scheduling of one PDSCH codeword and the random access process initiated by one command.

DCI 1B: used for compression scheduling of one PDSCH codeword with precoding information.

DCI 1C: used for high compression scheduling of one PDSCH codeword.

DCI 1D: used for compression scheduling of one PDSCH codeword with precoding information and power offset information.

DCI 2: used to schedule one PDSCH codeword under the situation of closed-loop spatial multiplexing.

DCI 2A: used to schedule one PDSCH codeword under the situation of open-loop spatial multiplexing.

DCI 3: used to transfer the transmit power control (TPC) command of the physical uplink control channel (PUCCH) and the physical uplink shared channel (PUSCH), and power adjustment information of 2 bits is used.

DCI 3A: used to transfer the TPC command of the PUCCH and PUSCH, and power adjustment information of 1 bit is used.

Wherein, the information bit fields mainly included in the DCI are as follows: a PUSCH frequency hopping flag, PUSCH resource allocation and frequency hopping allocation, an MCS level, a redundancy version (RV), a new data indicator (NDI), a TPC command for the scheduled PUSCH, cyclic shift and an orthogonal cover code (OCC) index for the demodulation reference signal (DMRS), an uplink (UL) index, a downlink assignment index (DAI), a channel state information (CSI) request, a sounding reference signal (SRS) request, a resource allocation type, a hybrid automatic repeat request (HARQ) procedure number, a TPC command for the scheduled PUCCH, etc.

With the evolution of the LTE technology, the 3GPP LTE can support more and more functions. Accordingly, new control information transmitted by the ePDCCH are more and more, e.g., for the time division duplexing (TDD) mode of the 3GPP LTE, uplink/downlink subframe configuration information of the TDD is semi-statically configured in the early release of the LTE, but if the network can use a related control channel to dynamically transmit the uplink/downlink subframe configuration information to a terminal user, it has a great significance for the system making full use of the features for the dynamic change of the uplink and downlink services and the dynamic change of the interference in the system to achieve the maximization of capacity. For aspects of using the ePDCCH to transmit the new control information, there are some methods in the related art below:

In method 1, reserved bits in related control format are used.

For example, some reserved bits are typically in the DCI 0, and these bits can be used to represent certain information. For example, the reserved bits are used to trigger the UE to perform the transmitting of the measurement reference signals aperiodically, etc.

In method 2, a new DCI is designed, for example, to support the precoding of which the rank is 1, some bits are added to indicate the precoding information, based on the DCI 1A, thereby forming a new DCI 1D.

However, both methods have great limitations, which present that:

For method 1, since the reserved bits are generally fewer, there are generally only 1-2 bits for the control information that can be transmitted. Moreover, if the reserved bits are used for transmitting certain information, when the new information is transmitted in the future, the method cannot be used any more. And, not all the control formats have the reserved bits.

For method 2, it will significantly increase the complexity of the receiver detecting the control channel, however, in the 3GPP LTE system, the location of the PDCCH transmitted by the transmitter is uncertain, the receiver needs to perform blind detections in multiple possible resource locations to determine if there is a DCI transmitted to itself according to the work mode of the receiver and the features of different control information formats. Adding a new control format will cause the detection complexity of the receiver to be increased dramatically, while introducing the new DCI will also bring relatively large control channel overhead.

For the 3GPP LTE system, beside using the ePDCCH to transmit the control information, the physical control format indicator channel (PCFICH) and the physical broadcast channel (PBCH) are also used to transmit the control information, and the PCFICH carries information of 2 bites to indicate the number of the orthogonal frequency-division multiplexing (OFDM) symbols occupied by the PDCCH control channel in the subframe where the PCFICH is located. The PBCH carries system bandwidth, system frame number information, automatic retransmission resource configuration information, etc., and the PBCH and PCFICH adopt QPSK modulation, which is the same as ePDCCH. And the differences are that, the formats of the PCFICH and PBCH are fixed, and the transmitted resource locations are fixed, and in the related art, there is no method for using the PCFICH, PBCH to carry the new control information.

SUMMARY OF THE INVENTION

The embodiment of the present invention provides a method and a device for transmitting control information to solve the problem that using the ePDCCH to transmit new information has great limitations and there is no effective method for using the PCFICH, PBCH to carry new control information in the related art.

The embodiment of the present invention provides a method for transferring control information, comprising:

a transmitting end orderly selecting one element $y_n$ or two elements $y_{2m-1}$, $y_{2m}$, from a sequence Y to be modulated corresponding to control information B newly added, wherein, n=1, 2 . . . L, L≤N, m=1, 2 . . . L/2, L is a even number and meets L≤2N, then selecting pairing elements $x_{2p-1}$, $x_{2p}$ from a sequence X to be modulated corresponding to related control information A, grouping $y_n$ or $y_{2m-1}$, $y_{2m}$ and $x_{2p-1}$, $x_{2p}$ into an element group $(x_{2p-1}, x_{2p}, y_n)$ or $(x_{2p-1}, x_{2p}, y_{2m-1}, y_{2m})$, and mapping $(x_{2p-1}, x_{2p}, y_n)$ or $(x_{2p-1}, x_{2p}, y_{2m-1}, y_{2m})$ as specified constellation points of a specified constellation diagram, and taking the constellation points as modulation symbols that one-to-one correspond to $(x_{2p-1}, x_{2p}, y_n)$ or $(x_{2p-1}, x_{2p}, y_{2m-1}, y_{2m})$, wherein, p∈[1, N];

taking every two elements in the elements, which are not used for pairing, of the sequence X as one element group to perform a quaternary phase shift keying (QPSK) modulation, modulating into QPSK modulation symbols; and mapping the constellation points and the QPSK modulation symbols to a part of or all resources occupied by a corresponding control channel to be transmitted.

Alternatively, in the above-mentioned method, the value of p is uniquely determined according to the value of n or m, and for different $y_n$ or $y_{2m-1}$, $y_{2m}$, pairing elements are also different.

Alternatively, in the above-mentioned method, in the specified constellation diagram:

the constellation points are uniformly distributed in four quadrants;

when an element group is in a form of $(x_{2p-1}, x_{2p}, y_n)$, there are two constellation points in each quadrant; when an element is in a form of $(x_{2p-1}, x_{2p}, y_{2m-1}, y_{2m})$, there are four constellation points in each quadrant;

when there are four constellation points in an ith quadrant, assuming that coordinates of a first constellation point are $(\alpha_{i,1}, \beta_{i,1})$, coordinates of a second constellation point are $(\alpha_{i,2}, \beta_{i,2})$, coordinates of a third constellation point are $(\alpha_{i,3}, \beta_{i,3})$ and coordinates of a fourth constellation point are $(\alpha_{i,4}, \beta_{i,4})$, and coordinates of a central symmetry point $y_i$ of the ith quadrant are defined as $$\left(\frac{\alpha_{i,1}+\alpha_{i,2}+\alpha_{i,3}+\alpha_{i,4}}{4}, \frac{\beta_{i,1}+\beta_{i,2}+\beta_{i,3}+\beta_{i,4}}{4}\right),$$

and when there are two constellation points in the ith quadrant, assuming that coordinates of a first constellation point are $(\alpha_{i,1}, \beta_{i,1})$, coordinates of a second constellation point are $(\alpha_{i,2}, \beta_{i,2})$, and coordinates of a central symmetry point $y_i$ of the ith quadrant are defined as $$\left(\frac{\alpha_{i,1}+\alpha_{i,2}}{2}, \frac{\beta_{i,1}+\beta_{i,2}}{2}\right),$$

and the constellation points are in a central symmetry for the central symmetry point $y_i$, i∈[1,4].

Alternatively, in the above-mentioned method, the transmitting end mapping $(x_{2p-1}, x_{2p}, y_n)$ or $(x_{2p-1}, x_{2p}, y_{2m-1}, y_{2m})$ as specified constellation points of a specified constellation diagram comprises:

determining quadrants where the constellation points are located according to $x_{2p-1}$, $x_{2p}$, wherein, $x_{2p-1}$, $x_{2p}$ have one-to-one mapping relationships with the quadrants where the constellation points are located; and determining constellation points of quadrants where $y_n$ or $y_{2m-1}$, $y_{2m}$ are located according to y or $y_{2m-1}$, $y_{2m}$, wherein, $y_n$ or $y_{2m-1}$, $y_{2m}$ have one-to-one mapping relationships with the constellation points in each quadrant.

Alternatively, the abovementioned method further comprises:

the transmitting end notifying related information of control information B newly added to a receiving end through a signaling; or the transmitting end agreeing on same related information of control information B newly added with a receiving end in advance; or the transmitting end agreeing on a part of information in related information of control information B newly added with a receiving end in advance, and notifying remaining information in the related information of the control information B newly added to the receiving end through a signaling.

Alternatively, in the above-mentioned method, the related information of the control information B newly added at least include related information of a corresponding control channel, information of L length, a rule for selecting pairing elements and a rule for mapping element groups to constellation points.

The embodiment of the present invention further provides a device for transmitting control information, comprising:

a first bit level processing unit, configured to generate a bit stream sequence X to be modulated corresponding to control information A, and include all processing before modulation;

a second bit level processing unit, configured to generate a bit stream sequence Y to be modulated corresponding to control information B newly added, and include all processing before modulation;

a unit for pairing information A and B and generating modulation symbols, configured to, map $(x_{2p-1}, x_{2p}, y_n)$ and $(x_{2p-1}, x_{2p}, y_{2m-1}, y_{2m})$ as specified constellation points of a specified constellation diagram to determine modulation symbols corresponding to $(x_{2p-1}, x_{2p}, y_n)$ or $(x_{2p-1}, x_{2p}, y_{2m-1}, y_{2m})$ according to a form of $(x_{2p-1}, x_{2p}, y_n)$ or a form of $(x_{2p-1}, x_{2p}, y_{2m-1}, y_{2m})$, and take every two elements in the elements, which are not used for pairing, in the sequence X as one element group, and perform a quaternary phase shift keying (QPSK) modulation to generate QPSK modulation symbols; and a unit for transmitting information A and B, configured to map the modulation symbols generated by the unit for pairing information A and B and generating modulation symbols to a part of or all resources occupied by a corresponding control channel to be transmitted.

Alternatively, in the above-mentioned device, the value of p is uniquely determined according to the value of n or m, and for different $y_n$ or $y_{2m-1}$, $y_{2m}$, pairing element are also different.

Alternatively, in the above-mentioned device, in the specified constellation diagram:

the constellation points are uniformly distributed in four quadrants;

when an element group is in a form of $(x_{2p-1}, x_{2p}, y_n)$, there are two constellation points in each quadrant; when an element group is in a form of $(x_{2p-1}, x_{2p}, y_{2m-1}, y_{2m})$, there are four constellation points in each quadrant;

when there are four constellation points in an ith quadrant, assuming that coordinates of a first constellation point are $(\alpha_{i,1}, \beta_{i,1})$, coordinates of a second constellation point are $(\alpha_{i,2}, \beta_{i,2})$, coordinates of a third constellation point are $(\alpha_{i,3}, \beta_{i,3})$ and coordinates of a fourth constellation point are $(\alpha_{i,4}, \beta_{i,4})$, and coordinates of a central symmetry point $y_i$ of the ith quadrant are defined as $$\left(\frac{\alpha_{i,1}+\alpha_{i,2}+\alpha_{i,3}+\alpha_{i,4}}{4}, \frac{\beta_{i,1}+\beta_{i,2}+\beta_{i,3}+\beta_{i,4}}{4}\right),$$

and when there are two constellation points in the ith quadrant, assuming that coordinates of a first constellation point are $(\alpha_{i,1}, \beta_{i,1})$, coordinates of a second constellation point are $(\alpha_{i,2}, \beta_{i,2})$, and coordinates of a central symmetry point $y_i$ of the ith quadrant are defined as $$\left(\frac{\alpha_{i,1}+\alpha_{i,2}}{2}, \frac{\beta_{i,1}+\beta_{i,2}}{2}\right),$$

and the constellation points are in a central symmetry for the central symmetry point $y_i$, $i \in [1,4]$.

Alternatively, in the above-mentioned device, the unit for pairing information A and B and generating modulation symbols, is configured to map $(x_{2p-1}, x_{2p}, y_n)$ or $(x_{2p-1}, x_{2p}, y_{2m-1}, y_{2m})$ as specified constellation points of a specified constellation diagram in the following ways:

determining quadrants where the constellation points are located according to $x_{2p-1}$, $x_{2p}$, wherein, $x_{2p-1}$, $x_{2p}$ have one-to-one mapping relationships with quadrants where the constellation points are located; and determining constellation points of quadrants where $y_n$ or $y_{2m-1}$, $y_{2m}$ are located according to $y_n$ or $y_{2m-1}$, $y_{2m}$, wherein, $y_n$ or $y_{2m-1}$, $y_{2m}$ have one-to-one mapping relationships with the constellation points in each quadrant.

The embodiment of the present invention further provides a method for transferring control information, comprising:

a receiving end performing a wireless signal processing operation on a received sequence R, $R=(r_1, r_2, r_3 \ldots r_N)$, obtaining a channel response $H_n$ corresponding to a symbol $r_n$, wherein, $n=1, 2 \ldots N$;

using $z_n = H_n^* r_n$ to generate a channel compensation sequence Z, wherein, $Z=(z_1, z_2, z_3 \ldots z_N)$;

for $Z=(z_1, z_2, z_3 \ldots z_N)$, according to one-to-one mapping relationships between $x_{2p-1}$, $x_{2p}$ and modulation symbols and one-to-one relationships between quaternary phase shift keying (QPSK) modulation information and modulation symbols, performing QPSK demodulation on the above sequence Z, and obtaining a received sequence $\tilde{X}$; $\tilde{X}=(\tilde{x}_1, \tilde{x}_2, \tilde{x}_3, \ldots \tilde{x}_{2n})$ corresponding to a transmitted sequence X;

performing reverse processing from control information A to the sequence X on the sequence $\tilde{X}$, and obtaining received control information A; and detecting control information B newly added according to the sequence $\tilde{X}$.

Alternatively, in the above-mentioned method, the receiving end detecting control information B newly added comprises:

selecting elements $\tilde{x}_{2p-1}$, $\tilde{x}_{2p}$ corresponding to pairing elements $x_{2p-1}$, $x_{2p}$ of the transmitting end from the sequence $\tilde{X}$, if a received compensation symbol $r_p$ corresponding to $\tilde{x}_{2p-1}$, $\tilde{x}_{2p}$ is in an ith quadrant, a real part of $r_p$ is $Re\{r_p\}$, and an imaginary part of $r_p$ is $Im\{r\}$, $p \in [1,2N]$, performing a coordinate conversion based on a central symmetry point of the ith quadrant on $Re\{u\}Im\{u\}$:

when there are four constellation points in one quadrant:

$$Re\{u_p\} = Re\{r_p\} - |H_p|^2 \frac{\alpha_{i,1}+\alpha_{i,2}+\alpha_{i,3}+\alpha_{i,4}}{4}$$

$$Im\{u_p\} = Im\{r_p\} - |H_p|^2 \frac{\beta_{i,1}+\beta_{i,2}+\beta_{i,3}+\beta_{i,4}}{4}$$

performing a QPSK demodulation on $u_p$ according to mapping relationships between constellation points in the quadrant i and modulation information, and obtaining a received sequence $\tilde{Y}$ corresponding to a sequence Y to be modulated of the transmitting end, wherein, $\tilde{Y}=(\tilde{y}_1, \tilde{y}_2, \tilde{y}_3, \ldots \tilde{y}_L)$;

when there are two constellation points in one quadrant:

$$Re\{u_p\} = Re\{r_p\} - |H_p|^2 \frac{\alpha_{i,1}+\alpha_{i,2}}{2}$$

$$Im\{u_p\} = Im\{r_p\} - |H_p|^2 \frac{\beta_{i,1}+\beta_{i,2}}{2}$$

Performing a binary phase shift keying (BPSK) demodulation on $u_p$ according to mapping relationships between constellation points in the quadrant i and modulation information, and obtaining a received sequence $\tilde{Y}$ corresponding to the sequence Y to be modulated of the transmitting end, wherein, $\tilde{Y}=(\tilde{y}_1, \tilde{y}_2, \tilde{y}_3, \ldots \tilde{y}_L)$; and performing reverse processing from control information B newly added to the sequence Y on the sequence $\tilde{Y}$, and obtaining received control information $\tilde{B}$.

Alternatively, the abovementioned method further comprises:

the receiving end agreeing on same related information of control information B newly added with the transmitting end in advance; or the receiving end receiving a signaling transmitted by the transmitting end, wherein, the signaling carries a part of or all related information of control information B newly added.

Alternatively, in the above-mentioned method, the related information of the control information B newly added at least include related information of a corresponding control channel, information of L length, a rule for selecting pairing elements and a rule for mapping element groups to constellation points.

The embodiments of the present invention further provide a device for receiving control information, comprising:

a received sequence channel compensation unit configured to use a estimated channel response to perform channel compensation on a received sequence R, obtain a channel response $H_n$, wherein, n=1, 2 . . . N, and use $z_n=H_n*r_n$ to generate a channel compensation sequence Z, wherein, $Z=(z_1, z_2, z_3 \ldots z_N)$ and according to one-to-one mapping relationships between $x_{2p-1}$, $x_{2p}$ and modulation symbols and one-to-one relationships between quaternary phase shift keying (QPSK) modulation information and modulation symbols, performing QPSK demodulation on the sequence Z, and obtain a received sequence $\tilde{X}$, $\tilde{X}=(\tilde{x}_1, \tilde{x}_2, \tilde{x}_3, \ldots \tilde{x}_{2n})$ corresponding to a transmitted sequence X;

a unit for detecting information A, configured to perform reverse processing from control information A to the sequence X on the sequence $\tilde{X}$, and obtain received control information $\tilde{A}$; and a unit for detecting information B, configured to detect control information B newly added according to the sequence $\tilde{X}$.

Alternatively, in above-mentioned device, the unit for detecting information B comprises:

a pairing element selection and coordinate conversion unit, configured to, select elements $\tilde{x}_{2p-1}, \tilde{x}_{2p}$ corresponding to pairing elements $x_{2p-1}, x_{2p}$ of the transmitting end from the sequence $\tilde{X}$, if a received compensation symbol r corresponding to $\tilde{x}_{2p-1}, \tilde{x}_{2p}$ is in an ith quadrant, a real part of $r_p$ is $\text{Re}\{r_p\}$, and an imaginary part of $r_p$ is $\text{Im}\{r_p\}$, p∈[1,2N], perform a coordinate conversion based on a central symmetry point of the ith quadrant on $\text{Re}\{u\}\text{Im}\{u\}$:

when there are four constellation points in one quadrant:

$$\text{Re}\{u_p\} = \text{Re}\{r_p\} - |H_p|^2 \frac{\alpha_{i,1} + \alpha_{i,2} + \alpha_{i,3} + \alpha_{i,4}}{4}$$

$$\text{Im}\{u_p\} = \text{Im}\{r_p\} - |H_p|^2 \frac{\beta_{i,1} + \beta_{i,2} + \beta_{i,3} + \beta_{i,4}}{4},$$

perform QPSK demodulation on $u_p$ according to mapping relationships between constellation points in the quadrant i and modulation information, and obtain a received sequence $\tilde{Y}$ corresponding to a sequence Y to be modulated of the transmitting end, wherein, $\tilde{Y}=(\tilde{y}_1, \tilde{y}_2, \tilde{y}_3, \ldots \tilde{y}_L)$;

when there are two constellation points in one quadrant:

$$\text{Re}\{u_p\} = \text{Re}\{r_p\} - |H_p|^2 \frac{\alpha_{i,1} + \alpha_{i,2}}{2}$$

$$\text{Im}\{u_p\} = \text{Im}\{r_p\} - |H_p|^2 \frac{\beta_{i,1} + \beta_{i,2}}{2},$$

perform a binary phase shift keying (BPSK) demodulation on $u_p$ according to mapping relationships between constellation points in the quadrant i and modulation information, and obtain a received sequence $\tilde{Y}$ corresponding to a sequence Y to be modulated of the transmitting end, wherein, $\tilde{Y}=(\tilde{y}_1, \tilde{y}_2, \tilde{y}_3, \ldots \tilde{y}_L)$; and a detecting unit, configured to perform reverse processing from control information B newly added to the sequence Y on the sequence $\tilde{Y}$, and obtain received control information $\tilde{B}$.

Alternatively, the above-mentioned device further comprises:

a receiving unit, configured to receive a signaling transmitted by the transmitted end, wherein, the signaling carries a part of or all related information of control information B newly added.

Alternatively, in the above-mentioned device, the related information of the control information B newly added at least include related information of a corresponding control channel, information of L length, a rule for selecting pairing elements and a rule for mapping element groups to constellation points.

In the technical scheme of the present application, the problems that using the ePDCCH to transmit new control information has great limitations and there is no effective method for using the PCFICH and PBCH to carry the new control information in the related art have been solved.

PREFERRED EMBODIMENTS OF THE INVENTION

The technical schemes of the embodiments of the present invention will be described in details below in conjunction with accompanying drawings. It should be illustrated that, in the case of not conflicting, the embodiments in the present application and features in these embodiments can be combined with each other arbitrarily.

For ease of illustration, control information can be transmitted by a corresponding control channel is assumed as information A below, and a sequence to be modulated corresponding to the information A is a sequence X, $X=(x_1, x_2, x_3, \ldots x_{2N})$, wherein, N represents the number of modulation symbols bearing the control information A. Generally, X is obtained by means of performing operations, such as cyclic redundancy check (CRC) adding and/or coding and interleaving and/or rate matching, etc., on the information A. Assuming that the new control information to be transmitted is information B, a sequence to be modulated corresponding to the information B is a sequence Y, $Y=(y_1, y_2, y_3, \ldots y_L)$, generally, Y is obtained by means of performing CRC adding and/or coding and interleaving and/or rate matching, etc., on the information B. L represents the length of the sequence to be modulated, in the embodiment of the present invention, the corresponding control channel can be: one or more PDCCHs and/or PCFICHs and/or PBCHs (according to the 3GPP LTE standard of the related art, multiple PDCCHs can be multiple PDCCHs which are transmitted in a same subframe or different subframes, multiple PCFICHs can be PCFICHs which are transmitted in different subframes, multiple PBCHs can be PBCHs which are transmitted in different subframes). In the embodiment of the present invention, for the related information of a corresponding control channel bearing information B, information of L length, the following rule for selecting pairing elements and the rule for mapping element groups to constellation points, the transmitting end needs to notify the receiving end through the signaling, or, the transmitting end and the receiving end adopt the same predefined rule, or adopt the way of combining the above-mentioned two ways, for example, part of the information are notified through the signaling, and the predefined way is used for part of the information, etc.

Embodiment 1

Figure 1:
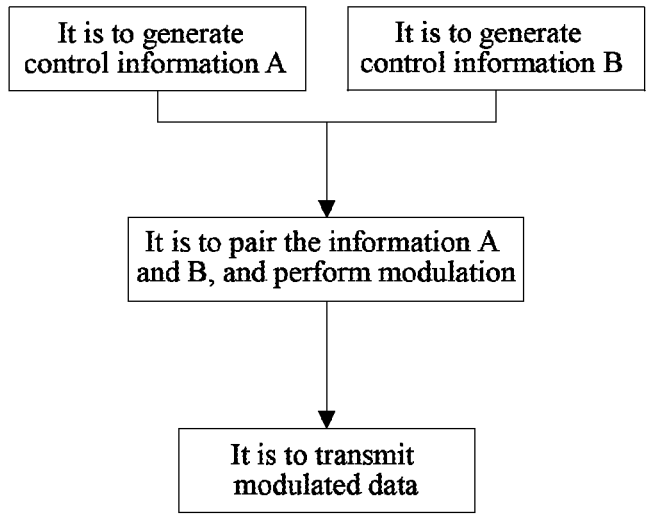
FIG. 1 is a flow chart of processing of a transmitting end according to the embodiment of the present invention.

The transmitter uses the PDCCH to transmit the DCI and transmit control information B newly added simultaneously, the process is shown in FIG. 1. Firstly, the transmitter performs operations such as CRC adding, coding and interleaving and rate matching, etc., on DCI Format 1A information to be transmitted according to the protocol of the related art, generating a bit sequence X, $X=(x_1, x_2, x_3, \ldots x_{2N})$ to be modulated, at this point, the aggregation level 1 is selected for the control channel, that is, one control channel element (CCE) resource is occupied, and at this point N=36, that is, the number of modulation symbols bearing information A is 36. It is to perform processing, such as channel coding, etc., on the information B to generate a sequence Y, $Y=(y_1, y_2, y_3, \ldots y_L)$ to be modulated, at this point, L=2N. The transmitting end notifies the related information of a corresponding control channel bearing information B (e.g. PDCCH is used instead of other control channels, or information B is born on one control channel, etc.), information of L length, the following rule for selecting pairing elements and the rule for mapping element groups to constellation points to the receiving end in advance through other control signalings.

Figure 4:
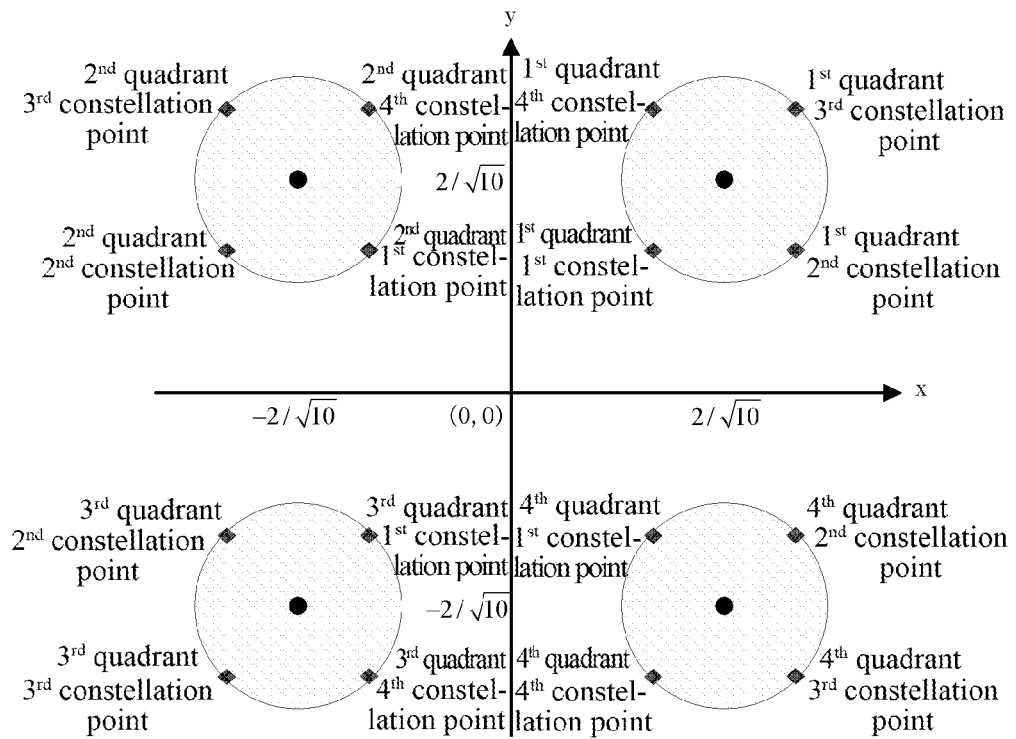
FIG. 4 is a schematic diagram of a specified constellation diagram used by pairing elements performing mapping according to the embodiment of the present invention.
Figure 5:
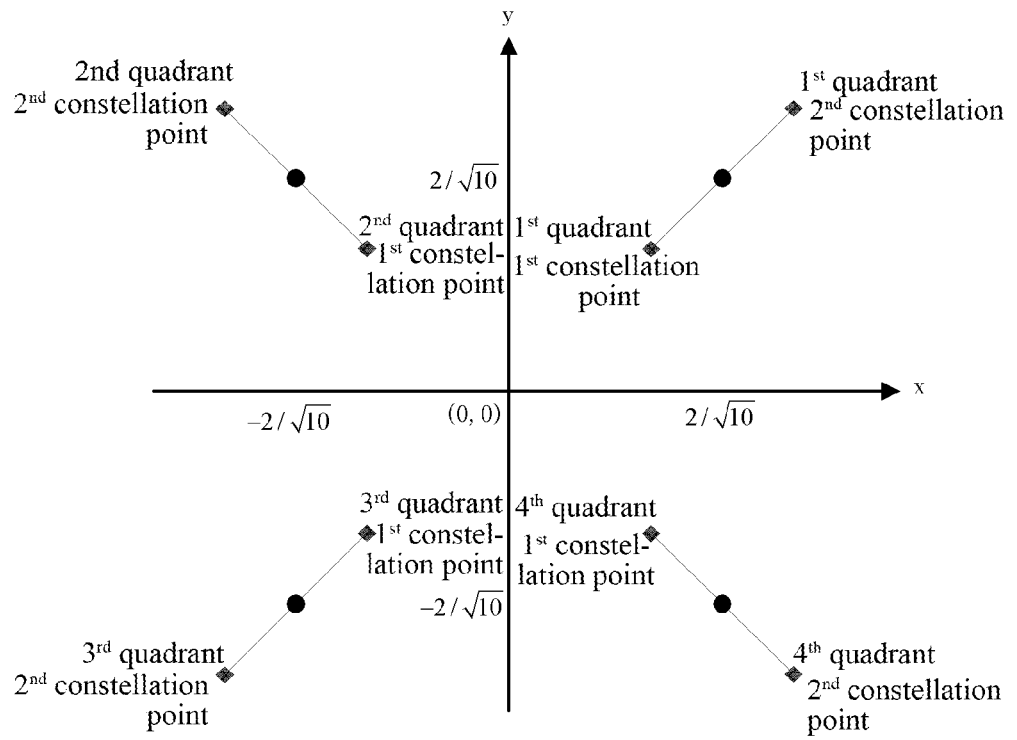
FIG. 5 is a schematic diagram of a specified constellation diagram used by pairing elements performing mapping according to the embodiment of the present invention.

The transmitter orderly selects two elements $y_{2m-1}$, $y_{2m}$ (m=1, 2 . . . L/2, L=2N) from the sequence Y, and selects pairing elements $x_{2p-1}$, $x_{2p}$ (p∈[1,N]) from the sequence X. For example, at this point, the pairing elements are selected according to the mapping relationship of p=m. $y_{2m-1}$, $y_{2m}$ and $x_{2p-1}$, $x_{2p}$ are grouped into an element group ($x_{2p-1}$, $x_{2p}y_{2m-1}$, $y_{2m}$), and ($x_{2p-1}$, $x_{2p}y_{2m-1}$, $y_{2m}$) are mapped as specified constellation points of a specified constellation diagram, and the constellation points can be taken as modulations symbols one-to-one corresponding to ($x_{2p-1}$, $x_{2p}$, $y_{2m-1}$, $y_{2m}$). The specified constellation diagram can be referred to FIG. 4 or FIG. 5, which has the following features:

1. the constellation points are uniformly distributed in four quadrants.
2. there are four constellation points in one quadrant.
3. it is assumed that the coordinates of the first constellation points are ($\alpha_{i,1}$, $\beta_{i,1}$), coordinates of the second constellation points are ($\alpha_{i,2}$, $\beta_{i,2}$), coordinates of the third constellation points are ($\alpha_{i,3}$, $\beta_{i,3}$) and coordinates of the fourth constellation points are ($\alpha_{i,4}$, $\beta_{i,4}$). Coordinates of a central symmetry point $y_i$ of the ith quadrant (i∈[1,4]) are defined as $$\left(\frac{\alpha_{i,1}+\alpha_{i,2}+\alpha_{i,3}+\alpha_{i,4}}{4}, \frac{\beta_{i,1}+\beta_{i,2}+\beta_{i,3}+\beta_{i,4}}{4}\right).$$

The above constellation points are in a central symmetry for the central symmetry point $y_i$.

Firstly, it is to determine quadrants where the constellation points are located according to $x_{2p-1}$, $x_{2p}$·$x_{2p-1}$, $x_{2p}$ have one-to-one mapping relationships with quadrants where the constellation points are located, and when $x_{2p-1}$, $x_{2p}$ are "00", the mapped constellation point is located in the first quadrant; when $x_{2p-1}$, $x_{2p}$ are "10", the mapped constellation point is located in the second quadrant; when $x_{2p-1}$, $x_{2p}$ are "11", the mapped constellation point is located in the third quadrant; when $x_{2p-1}$, $x_{2p}$ are "01", the mapped constellation point is located in the fourth quadrant.

Secondly, it is to determine the constellation points of the quadrant i i∈[1,4], where constellation points are located according to $y_{2m-1}$, $y_{2m}$·$y_{2m-1}$, $y_{2m}$ have one-to-one mapping relationships with the constellation points in each quadrant: when $y_{2m-1}$, $y_{2m}$ are "00", they can be mapped as the first constellation point in the quadrant i, and the coordinates are ($\alpha_{i,1}$, $\beta_{i,1}$); when $y_{2m-1}$, $y_{2m}$ are "01", they can be mapped as the second constellation point in the quadrant i, and the coordinates are ($\alpha_{i,2}$, $\beta_{i,2}$); when $y_{2m-1}$, $y_{2m}$ are "11", they can be mapped as the third constellation point in the quadrant i, and the coordinates are ($\alpha_{i,3}$, $\beta_{i,3}$); when $y_{2m-1}$, $y_{2m}$ are "10", they can be mapped as the fourth constellation point in the quadrant i, and the coordinates are ($\alpha_{i,4}$, $\beta_{i,4}$).

Moreover, for the rule agreement or notification, when the quadrants determined by $x_{2p-1}$, $x_{2p}$ are different, the one-to-one mapping relationships between $y_{2m-1}$, $y_{2m}$ and the constellation points in the quadrant are also different. For example, when the quadrant determined by $x_{2p-1}$, $x_{2p}$ is the first quadrant or the third quadrant, the constellation point in the quadrant corresponding to ($x_{2p-1}$, $x_{2p}$, $y_{2m-1}$, $y_{2m}$) is determined according to the following rules: when $y_{2m-1}$, $y_{2m}$ are "00", they can be mapped as the first constellation point in the quadrant i, and the coordinates are ($\alpha_{i,1}$, $\beta_{i,1}$); when $y_{2m-1}$, $y_{2m}$ are "01", they can be mapped as the second constellation point in the quadrant i, and the coordinates are ($\alpha_{i,2}$, $\beta_{i,2}$); when $y_{2m-1}$, $y_{2m}$ are "11", they can be mapped as the third constellation point in the quadrant i, and the coordinates are ($\alpha_{i,3}$, $\beta_{i,3}$); when $y_{2m-1}$, $y_{2m}$ are "10", they can be mapped as the fourth constellation point in the quadrant i, and the coordinates are ($\alpha_{i,4}$, $\beta_{i,4}$). However, when the quadrant determined by $x_{2p-1}$, $x_{2p}$ is the second quadrant or the fourth quadrant, the constellation point in the quadrant corresponding to ($x_{2p-1}$, $x_{2p}$, $y_{2m-1}$, $y_{2m}$) is determined according to the following rules: when $y_{2m-1}$, $y_{2m}$ are "01", they can be mapped as the first constellation point in the quadrant i, and the coordinates are ($\alpha_{i,1}$, $\beta_{i,1}$); when $y_{2m-1}$, $y_{2m}$ is "11", they can be mapped as the second constellation point in the quadrant i, and the coordinates are ($\alpha_{i,2}$, $\beta_{i,2}$); when $y_{2m-1}$, $y_{2m}$ mare "10", they can be mapped as the third constellation point in the quadrant i, and the coordinates are ($\alpha_{i,3}$, $\beta_{i,3}$); when $y_{2m-1}$, $y_{2m}$ are "00", they can be mapped as the fourth constellation point in the quadrant i, and the coordinates are ($\alpha_{i,4}$, $\beta_{i,4}$).

Subsequently, the above modulation symbols are mapped to the resources of the above PDCCH and transmitted, and the steps for transmitting wireless signals such as orthogonal frequency division multiplexing modulation, digital to analog conversion, frequency up-conversion, etc., may be performed before they are transmitted.

Figure 2:
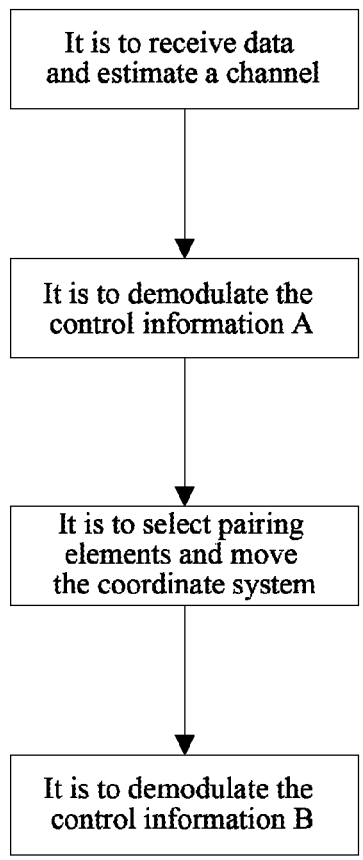
FIG. 2 is a flow chart of processing of a receiving end according to the embodiment of the present invention.

After the transmission of the wireless channel, and the frequency down-conversion, analog to digital conversion and orthogonal frequency division multiplexing demodulation performed by the receiving end, the received sequence is the sequence R, $R=(r_1, r_2, r_3 \ldots r_N)$, and the channel response corresponding to the received symbol r is $H_n$ (n=1, 2 . . . N). The receiving process of the receiving end is shown in FIG. 2.

Firstly, it is to use $z_n=H_n*r_n$ to generate the channel compensation sequence Z, $Z=(z_1, z_2, z_3 \ldots z_N)$.

Secondly, for $Z=(z_1, z_2, z_3 \ldots z_N)$, according to one-to-one mapping relationships between $x_{2p-1}$, $x_{2p}$ and modulation symbols and one-to-one relationships between QPSK modulation information and modulation symbols, and it is to perform QPSK demodulation on the above sequence Z, and obtain a received sequence $\tilde{X}$, $\tilde{X}=(\tilde{y}_1, \tilde{y}_2, \tilde{y}_3, \ldots \tilde{y}_L)$ corresponding to a transmitted sequence X.

Subsequently, it is to perform reverse processing from the DCI to the sequence X on the sequence $\tilde{X}$, and obtain the received DCI.

Then, it is to select elements $\tilde{x}_{2p-1}$, $\tilde{x}_{2p}$ (p∈[1,N]) corresponding to pairing elements $x_{2p-1}$, $x_{2p}$ (p∈[1,N]) of the transmitting end from the sequence $\tilde{X}$, assuming that a received compensation symbol $r_p$ corresponding to $\tilde{x}_{2p-1}$, $\tilde{x}_{2p}$ (p∈[1,N]) is in the ith quadrant, the real part of $r_p$ is Re$\{r_p\}$, and the imaginary part of $r_p$ is Im$\{r_p\}$, and to perform a coordinate conversion based on a central symmetry point of the quadrant on Re$\{u\}$Im$\{u\}$:

$$\text{Re}\{u_p\} = \text{Re}\{r_p\} - |H_p|^2 \frac{\alpha_{i,1} + \alpha_{i,2} + \alpha_{i,3} + \alpha_{i,4}}{4}$$

$$\text{Im}\{u_p\} = \text{Im}\{r_p\} - |H_p|^2 \frac{\beta_{i,1} + \beta_{i,2} + \beta_{i,3} + \beta_{i,4}}{4}.$$

Lastly, it is to perform QPSK demodulation in the quadrant on $u_p$ according to mapping relationships between constellation point in the quadrant i and modulation information, and obtain a received sequence $\tilde{Y}$, $\tilde{Y}=(\tilde{y}_1, \tilde{y}_2, \tilde{y}_3, \ldots \tilde{y}_L)$ corresponding to the sequence Y to be modulated of the transmitting end. It is to perform reverse processing from the control information B to the sequence Y on the sequence $\tilde{Y}$, and obtain received information $\tilde{B}$.

In the embodiment, when the downlink control information is transferred, the method for carrying new control information described in the embodiment of the present invention is adopted, in this method, under the premise of not increasing the overhead of the downlink control information, the new control information and the downlink control information can be simultaneously transmitted to the receiving end, and the same resources with the related information are used, which can better ensure high reliability transmission of the new control information, and while the receiving end can reuse the method in the related art to detect the corresponding control information.

Embodiment 2

Figure 3:
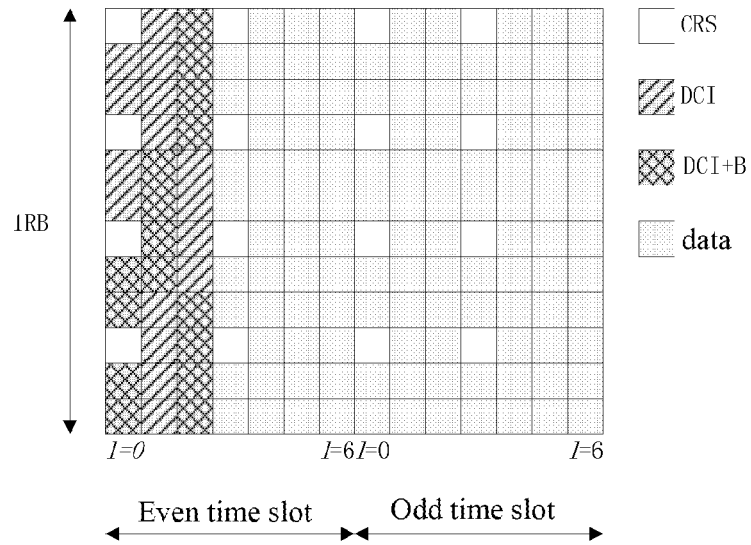
FIG. 3 is a schematic diagram of resource occupancy of downlink control information combining with new control information B in one resource block according to the embodiment of the present invention.

The transmitter uses the PDCCH to transmit the DCI 1B information and transmit new control information B simultaneously, at this point, the B information is the dynamic subframe configuration information of the TDD LTE system, the length of information bit is 3 bits. Firstly, the transmitter performs operations such as CRC adding, coding and interleaving and rate matching, etc., on DCI Format 1B information to be transmitted, according to the protocol of the related art, generating a bit sequence X, X=($x_1$, $x_2$, $x_3$, ... $x_{2N}$) to be modulated, at this point, the aggregation level 1 is selected for the control channel, that is, one control channel element (CCE) resource is occupied, and at this point N=36. It is to perform processing, such as channel coding on the information B etc., to generate a sequence Y, Y=($y_1$, $y_2$, $y_3$, ... $y_L$) to be modulated, at this point, L=24. At this point, L<2N, the new control information B only occupies part of resources used by DCI, as shown in FIG. 3. For the related information of a corresponding control channel bearing information B (e.g. PDCCH is used instead of other control channels, or which resources on one control channel the information B is born on, etc.), information of L length, the following rule for selecting pairing elements and the rule for mapping element groups to constellation points to the receiving end in advance through other control signalings, the same predefined length and rule are adopted by the transmitting end and receiving end.

The transmitter orderly selects two elements $y_{2m-1}$, $y_{2m}$ (m=1, 2 ... L/2, L=24) from the sequence Y, and selects pairing elements $x_{2p-1}$, $x_{2p}$, p∈[1,N] from the sequence X according to an agreed rule. For example, at this point, the pairing elements are selected according to the mapping relationship of p=m. $y_{2m-1}$, $y_{2m}$ and $x_{2p-1}$, $x_{2p}$ are grouped into an element group ($x_{2p-1}$, $x_{2p}$, $y_{2m-1}$, $y_{2m}$), and ($x_{2p-1}$, $x_{2p}$, $y_{2m-1}$, $y_{2m}$) are mapped as specified constellation points of specified constellation diagram, and the constellation points can be taken as modulations symbols one-to-one corresponding to ($x_{2p-1}$, $x_{2p}$, $y_{2m-1}$, $y_{2m}$), and the specified constellation diagram have the following features:

1. the constellation points are uniformly distributed in four quadrants.
2. there are four constellation points in each quadrant.
3. when there are four constellation points in the ith quadrant (i∈[1,4]), assuming that coordinates of the first constellation points are ($\alpha_{i,1}$, $\beta_{i,1}$), coordinates of the second constellation points are ($\alpha_{i,2}$, $\beta_{i,2}$), coordinates of the third constellation points are ($\alpha_{i,3}$, $\beta_{i,3}$), coordinates of the fourth constellation points are ($\alpha_{i,4}$, $\beta_{i,4}$). Coordinates of a central symmetry point $y_i$ of the ith quadrant (i∈[1,4]) are defined as $$\left(\frac{\alpha_{i,1} + \alpha_{i,2} + \alpha_{i,3} + \alpha_{i,4}}{4}, \frac{\beta_{i,1} + \beta_{i,2} + \beta_{i,3} + \beta_{i,4}}{4}\right).$$

Similarly, when there are two constellation points in the ith quadrant (i=1, 2, 3, 4), assuming that coordinates of the first constellation points are ($\alpha_{i,1}$, $\beta_{i,1}$), coordinates of the second constellation points are ($\alpha_{i,2}$, $\beta_{i,2}$), coordinates of a central symmetry point $y_i$ of the ith quadrant (i∈[1,4]) are defined as $$\left(\frac{\alpha_{i,1} + \alpha_{i,2}}{2}, \frac{\beta_{i,1} + \beta_{i,2}}{2}\right),$$

and the constellation points are in a central symmetry for the central symmetry point $y_i$.

Firstly, it is to determine quadrants where the constellation points are located according to $x_{2p-1}$, $x_{2p}$·$x_{2p-1}$, $x_{2p}$ have one-to-one mapping relationships with quadrants where the constellation points are located, when $x_{2p-1}$, $x_{2p}$ are "01", the mapped constellation point is located in the first quadrant; when $x_{2p-1}$, $x_{2p}$ are "11", the mapped constellation point is located in the second quadrant; when $x_{2p-1}$, $x_{2p}$ are "10", the mapped constellation point is located in the third quadrant; when $x_{2p-1}$, $x_{2p}$ are "00", the mapped constellation point is located in the fourth quadrant.

Secondly, it is to determine the constellation points of the quadrant i i∈[1,4] where constellation points are located according to $y_{2m-1}$, $y_{2m}$·$y_{2m-1}$, $y_{2m}$ have one-to-one mapping relationships with the constellation points in each quadrant: when $y_{2m-1}$, $y_{2m}$ are "00", they can be mapped as the first constellation point in the quadrant i, and the coordinates are ($\alpha_{i,1}$, $\beta_{i,1}$); when $y_{2m-1}$, $y_{2m}$ is "01", they can be mapped as the second constellation point in the quadrant i, and the coordinates are ($\alpha_{i,2}$, $\beta_{i,2}$); when $y_{2m-1}$, $y_{2m}$ are "11", they can be mapped as the third constellation point in the quadrant i, and the coordinates are ($\alpha_{i,3}$, $\beta_{i,3}$); when $y_{2m-1}$, $y_{2m}$ are "10", they can be mapped as the fourth constellation point in the quadrant i, the coordinates are $(\alpha_{i,4}, \beta_{i,4})$. At this point, coordinates of the central symmetry point $y_i$ of the ith quadrant are $$\left(\frac{\alpha_{i,1} + \alpha_{i,2} + \alpha_{i,3} + \alpha_{i,4}}{4}, \frac{\beta_{i,1} + \beta_{i,2} + \beta_{i,3} + \beta_{i,4}}{4}\right),$$

and the above constellation points are in a central symmetry for the central symmetry point $y_i$. Moreover, when the quadrants determined by $x_{2p-1}$, $x_{2p}$ are different, the one-to-one mapping relationships between $y_{2m-1}$, $y_{2m}$ and the constellation points in the quadrant are also different. There are some elements in the sequence X which are not used for pairing elements $x_{2p-1}$, $x_{2p}$, $p \in [25,N]$, it is to take two of them as an element group $(x_{2p-1}, x_{2p})$ to perform QPSK modulation, modulating into QPSK modulation symbols.

Subsequently, the above modulation symbols are mapped to the resources of the above PDCCH and transmitted, and the steps for transmitting wireless signals such as orthogonal frequency division multiplexing modulation, digital to analog conversion, frequency up-conversion, etc., may be performed before they are transmitted.

After the transmission of the wireless channel and the frequency down-conversion, analog to digital conversion, orthogonal frequency division multiplexing demodulation performed by the receiving end, the received sequence is the sequence R, $R=(r_1, r_2, r_3 \ldots r_N)$, and the channel response corresponding to the received symbol r is $H_n$ (n=1, 2 . . . N).

Firstly, it is to use $z_n=H_n^* r_n$ to generate the channel compensation sequence Z $Z=(z_1, z_2, z_3 \ldots z_N)$.

Secondly, for $Z=(z_1, z_2, z_3 \ldots z_N)$, according to one-to-one mapping relationships between $x_{2p-1}$, $x_{2p}$ and modulation symbols and one-to-one relationships between QPSK modulation information and modulation symbols, and it is to perform QPSK demodulation on the above sequence Z, and obtain a received sequence $\tilde{X}$, $\tilde{X}=(\tilde{x}_1, \tilde{x}_2, \tilde{x}_3, \ldots \tilde{x}_{2n})$ corresponding to the transmitted sequence X.

Subsequently, it is to perform reverse processing from the DCI to the sequence X on the sequence $\tilde{X}$, and obtain the received DCI.

Then, it is to select element $\tilde{x}_{2p-1}$, $\tilde{x}_{2p}$ ($p \in [1, L/2]$) corresponding to pairing elements $x_{2p-1}$, $x_{2p}$ ($p \in [1, L/2]$) of the transmitting end from the sequence $\tilde{X}$, assuming that a received compensation symbol pr corresponding to $\tilde{x}_{2p-1}$, $\tilde{x}_{2p}$ ($p \in [1, L/2]$) is in the ith quadrant i ($i \in [1,4]$), the real part of $r_p$ is Re$\{r_p\}$, and the imaginary part of $r_p$ is Im$\{p\}$, and to perform coordinate conversion based on a central symmetry point of the quadrant on Re$\{u\}$Im$\{u\}$ $$\text{Re}\{u_p\} = \text{Re}\{r_p\} - |H_p|^2 \frac{\alpha_{i,1} + \alpha_{i,2} + \alpha_{i,3} + \alpha_{i,4}}{4}$$

$$\text{Im}\{u_p\} = \text{Im}\{r_p\} - |H_p|^2 \frac{\beta_{i,1} + \beta_{i,2} + \beta_{i,3} + \beta_{i,4}}{4}.$$

Lastly, it is to perform QPSK demodulation in the quadrant i on $u_p$ according to mapping relationships between constellation point in the quadrant i and modulation information, and obtain a received sequence $\tilde{Y}$, $\tilde{Y}=(\tilde{y}_1, \tilde{y}_2, \tilde{y}_3, \ldots \tilde{y}_L)$ corresponding to the sequence Y to be modulated of the transmitting end. At this point, since the mapping relationships between the constellation points in different quadrants and the modulation information may be different, this causes that the QPSK demodulation in different quadrants may be different. It is to perform reverse processing from the information B to the sequence Y on the sequence $\tilde{Y}$, obtain the received information $\tilde{B}$ and the required dynamic subframe configuration information of TDD.

In the embodiment, when the downlink control information is transferred, the method for carrying new control information described in the embodiment of the present invention is adopted, in this method, under the premise of not increasing the overhead of the downlink control information, the new control information and the downlink control information can be simultaneously transmitted to the receiving end, and the same resources with the related information are used, which can better ensure high reliability transmission of the new control information, and while the receiving end can reuse the method in the related art to detect the related control information. Moreover, L=24 (L<36) described in the embodiment of the present invention is just an example, the transmitting end can select the value of L reasonably according to factors such as channel environment, etc., which can ensure to achieve a commendable trade-off in the aspects of performances of the new control information and the related control information.

Embodiment 3

The transmitter uses two PDCCHs to transmit respective DCIs and transmit new control information B simultaneously. Firstly, the transmitter performs operations such as CRC adding, coding and interleaving and rate matching, etc., on the first DCI Format 1A information (born by PDCCH1) to be transmitted, according to the protocol of the related art, generating a sequence X1, $X1=(x_1, x_2, x_3, \ldots x_{2a})$ to be modulated, at this point, the aggregation level 1 is selected for the the first PDCCH, that is, one CCE resource is occupied, and at this point a=36; the transmitter performs operations such as CRC adding, coding and interleaving and rate matching, etc., on the second DCI Format 2 information (born by PDCCH2) to be transmitted, generating a sequence X2, $X2=(x_1, x_2, x_3, \ldots x_{2b})$ to be modulated, at this point, the aggregation level 2 is selected for the second PDCCH, that is, two CCE resources are occupied, and at this point b=72. It is to multiplex two PDCCHs to group into a sequence X, and X is the combination of the sequence X1 and the sequence X2, at this point, $X=(x_1, x_2, x_3, \ldots x_{2N})$, N=108. It is to perform processing, such as channel coding etc., on the information B to generate a sequence Y, $Y=(y_1, y_2, y_3, \ldots y_L)$ to be modulated, at this point, L=N. For the related information of a corresponding control channel bearing information B (e.g. PDCCH is used instead of other control channels, or which resources on two control channels the information B is born on, etc.), information of L length, the following rule for selecting pairing elements and the rule for mapping element groups to constellation points, the transmitting end adopts a certain predefined rule which is same with that of the receiving end. Moreover, the information of L length is notified to the receiving end in advance through other control signalings.

The transmitter orderly selects one elements $y_n$ (n=1, 2 . . . L, L=N) from the sequence Y, and selects pairing elements $x_{2p-1}$, $x_{2p}$ ($p \in [1,N]$) from the sequence X. For example, at this point, it is assumed that the pairing elements are selected according to the mapping relationship of p=(n+2) % N+1. $y_n$ and $x_{2p-1}$, $x_{2p}$ are grouped into an element group $(x_{2p-1}, x_{2p}, y_n)$, and $(x_{2p-1}, x_{2p}, y_n)$ are mapped as specified constellation points of specified constellation diagram. And the constellation points can be taken as modulation symbols one-to-one corresponding to $(x_{2p-1}, x_{2p}, y_n)$, the specified constellation diagram has the following features:

1. the constellation points are uniformly distributed in four quadrants.

2. there are two constellation points in each quadrant.
3. when there are two constellation points in the ith quadrant (i=1, 2, 3, 4), assuming that coordinates of the first constellation point are $(\alpha_{i,1}, \beta_{i,1})$, coordinates of the second constellation point are $(\alpha_{i,2}, \beta_{i,2})$, coordinates of a central symmetry point $y_i$ of the ith quadrant (i∈[1,4]) are defined as $$\left(\frac{\alpha_{i,1}+\alpha_{i,2}}{2}, \frac{\beta_{i,1}+\beta_{i,2}}{2}\right),$$

and the above constellation points are in a central symmetry for the central symmetry point $y_i$.

Firstly, it is to determine quadrants where the constellation points are located according to $x_{2p-1}, x_{2p}$. $x_{2p-1}, x_{2p}$ have one-to-one mapping relationships with quadrants where the constellation points are located, for example, according to the QPSK modulation rule, when $x_{2p-1}, x_{2p}$ are "00", the mapped constellation point is located in the first quadrant; when $x_{2p-1}, x_{2p}$ are "10", the mapped constellation point is located in the second quadrant; when $x_{2p-1}, x_{2p}$ are "11", the mapped constellation point is located in the third quadrant; when $x_{2p-1}, x_{2p}$ are "01", the mapped constellation point is located in the fourth quadrant.

Secondly, it is to determine the constellation points of the quadrant i, i∈[1,4] where constellation points are located according to $y_n.y_n$ has a one-to-one mapping relationship with the constellation points in ith quadrant, when $y_n$ is "0", it is mapped as the first constellation point in the quadrant i, and coordinates are $(\alpha_{i,1}, \beta_{i,1})$; when y is "1", it is mapped as the second constellation point in the quadrant i, and coordinates are $(\alpha_{i,2}, \beta_{i,2})$. At this point, coordinates of the central symmetry point $y_i$ of the ith quadrant are $$\left(\frac{\alpha_{i,1}+\alpha_{i,2}}{2}, \frac{\beta_{i,1}+\beta_{i,2}}{2}\right),$$

and the above constellation points are in a central symmetry for the central symmetry point $y_i$. Moreover, when the quadrants determined by $x_{2p-1}, x_{2p}$ are different, the one-to-one mapping relationships between $y_n$ and the constellation points in the quadrant i are also different.

Subsequently, the above modulation symbols are mapped to the resources of the above PDCCH and transmitted, and the steps for transmitting wireless signals such as orthogonal frequency division multiplexing modulation, digital to analog conversion, frequency up-conversion, etc., may be performed before they are transmitted.

After the transmission of the wireless channel, and the frequency down-conversion, analog to digital conversion, orthogonal frequency division multiplexing demodulation performed by the receiving end, the sequence received by the receiving end is the sequence R, $R=(r_1, r_2, r_3 \ldots r_N)$, and the channel response corresponding to the received symbol $r_n$ is $H_n$ (n=1, 2 ... N).

Firstly, it is to use $z_n=H_n^*r_n$ to generate the channel compensation sequence Z, $Z=(z_1, z_2, z_3 \ldots z_N)$.

Secondly, for $Z=(z_1, z_2, z_3 \ldots z_N)$, according to one-to-one mapping relationships between $x_{2p-1}, x_{2p}$ and modulation symbols and one-to-one relationships between QPSK modulation information and modulation symbols, and it is to perform QPSK demodulation on the above sequence Z, and obtain a received sequence $\tilde{X}$, $\tilde{X}=(\tilde{x}_1, \tilde{x}_2, \tilde{x}_3, \ldots \tilde{x}_{2n})$ corresponding to a transmitted sequence X.

Subsequently, it is to perform reverse processing from the DCI to the sequence X on the sequence $\tilde{X}$, and obtain two received DCIs.

Then, it is to select elements $\tilde{x}_{2p-1}, \tilde{x}_{2p}$ (p∈[1,N]) corresponding to pairing elements $x_{2p-1}, x_{2p}$ (p∈[1,N]) of the transmitting end from the sequence $\tilde{X}$, assuming that a received compensation symbol $r_p$ corresponding to $\tilde{x}_{2p-1}, \tilde{x}_{2p}$ (p∈[1,N]) is in the ith quadrant, a real part of $r_p$ is Re$\{r_p\}$, and an imaginary part of $r_p$ is Im$\{r_p\}$, and to perform coordinate conversion based on a central symmetry point of the quadrant on Re$\{u\}$Im$\{u\}$:

$$\text{Re}\{u_p\} = \text{Re}\{r_p\} - |H_p|^2 \frac{\alpha_{i,1}+\alpha_{i,2}}{2}$$

$$\text{Im}\{u_p\} = \text{Im}\{r_p\} - |H_p|^2 \frac{\beta_{i,1}+\beta_{i,2}}{2}.$$

Lastly, it is to perform BPSK demodulation on $u_p$ according to mapping relationships between constellation points in the quadrant i and modulation information, and obtain a received sequence $\tilde{Y}$, $\tilde{Y}=(\tilde{y}_1, \tilde{y}_2, \tilde{y}_3, \ldots \tilde{y}_L)$, corresponding to the sequence Y to be modulated of the transmitting end. It is to perform reverse processing from the information B to the sequence Y on the sequence $\tilde{Y}$, and obtain the received information $\tilde{B}$.

In the embodiment, when multiple downlink control information is transferred, the method for carrying new control information described in the embodiment of the present invention is adopted, in this method, under the premise of not increasing the overhead of the downlink control information, the new control information and the downlink control information can be simultaneously transmitted to the receiving end, and the same resources with the related information are used, which can better ensure high reliability transmission of the new control information, and while the receiving end can reuse the method in the related art to detect the related control information. Moreover, using two PDCCHs to transmit the new control information described in the embodiment of the present invention is just an example, the transmitting end can select the number of the control channels reasonably according to factors such as channel environment, etc., which can ensure to achieve a commendable trade-off in the aspects of performances of the new control information and the related control information.

Embodiment 4

The transmitter uses the PDCCH to transmit the DCI and transmit new control information B simultaneously. Firstly, the transmitter performs operations such as CRC adding, coding and interleaving and rate matching, etc., on DCI Format 2A information to be transmitted according to the protocol of the related art, generating a bit sequence X, $X=(x_1, x_2, x_3, \ldots x_{2N})$ to be modulated, at this point, the aggregation level 2 is selected for the control channel, that is, two control channel element (CCE) resources are occupied, and at this point N=72. It is to perform processing, such as channel coding on the information B etc., to generate a sequence Y, $Y=(y_1, y_2, y_3, \ldots y_L)$ to be modulated, at this point, L=48. That is, L<2N, the new control information B only occupies part of resources used by the DCI. For the related information of a corresponding control channel bearing information B (e.g. PDCCH is used instead of other control channels, or which resources on two control channels the information B is born on, etc.), the following rule for selecting pairing elements and the rule for mapping the element groups to constellation points, the transmitting end adopts a certain predefined rule which is same with that of the receiving end. Moreover, the information of L length is notified to the receiving end in advance through other control signalings.

The transmitter orderly selects one element $y_n$ (m=1, 2 . . . L, L=48) from the sequence Y, and selects pairing elements $x_{2p-1}$, $x_{2p}$ (p∈[1,N]) from the sequence X. It is assumed that the pairing elements are selected according to the mapping relationship of p=(r*(n−1)) % L+1, wherein, "%" represents the modulo operation, for example, 12%10=2, r is a positive integer which is coprime with L. y and $x_{2p-1}$, $x_{2p}$ are grouped into an element group ($x_{2p-1}$, $x_{2p}$, $y_n$), and ($x_{2p-1}$, $x_{2p}$, $y_n$) are mapped as specified constellation points of specified constellation diagram. The constellation points can be taken as modulation symbols one-to-one corresponding to ($x_{2p-1}$, $x_{2p}$, $y_n$), the specified constellation diagram has the following features:
1. the constellation points are uniformly distributed in four quadrants.
2. there are two constellation points in each quadrant.
3. when there are two constellation points in the ith quadrant (i=1, 2, 3, 4), it is assumed that coordinates of the first constellation point are ($\alpha_{i,1}$, $\beta_{i,1}$), coordinates of the second constellation point are ($\alpha_{i,2}$, $\beta_{i,2}$), coordinates of a central symmetry point $y_z$ of the ith quadrant (i∈[1,4]) are defined as $$\left(\frac{\alpha_{i,1} + \alpha_{i,2}}{2}, \frac{\beta_{i,1} + \beta_{i,2}}{2}\right),$$

and the constellation points are in a central symmetry for the central symmetry point $y_i$.

Firstly, it is to determine quadrants where the constellation points are located according to $x_{2p-1}$, $x_{2p}$·$x_{2p-1}$, $x_{2p}$ have one-to-one mapping relationships with quadrants where the constellation points are located, when $x_{2p-1}$, $x_{2p}$ are "11", the mapped constellation point is located in the first quadrant; when $x_{2p-1}$, $x_{2p}$ are "10", the mapped constellation point is located in the second quadrant; when $x_{2p-1}$, $x_{2p}$ are "00", the mapped constellation point is located in the third quadrant; when $x_{2p-1}$, $x_{2p}$ are "01", the mapped constellation point is located in the fourth quadrant.

Secondly, it is to determine the constellation points of the quadrant i i∈[1,4] where constellation points are located according to $y_n$·$y_n$ has one-to-one mapping relationships with the constellation points in ith quadrant: when $y_n$ is "0", it is mapped as the first constellation point in the quadrant i, and coordinates are ($\alpha_{i,1}$, $\beta_{i,1}$); when y is "1", it is mapped as the second constellation point in the quadrant i, and coordinates are ($\alpha_{i,2}$, $\beta_{i,2}$). At this point, coordinates of the central symmetry point $y_i$ of the ith quadrant are $$\left(\frac{\alpha_{i,1} + \alpha_{i,2}}{2}, \frac{\beta_{i,1} + \beta_{i,2}}{2}\right),$$

and the above constellation points are in a central symmetry for the central symmetry point $y_i$. Moreover, when the quadrants determined by $x_{2p-1}$, $x_{2p}$ are different, the one-to-one mapping relationships between $y_n$ and the constellation points in the quadrant are also different. There are some elements in the sequence X not used for pairing elements $x_{2p-1}$, $x_{2p}$, p∈[49,N], it is to take two of them as one element group $x_{2p-1}$, $x_{2p}$ to perform QPSK modulation, modulating into QPSK modulation symbols.

Subsequently, it is to map the above modulation symbols to the resources of the above PDCCH.

Lastly, after the channel is integrated with other channels, it is to perform the steps, such as orthogonal frequency division multiplexing modulation, digital to analog conversion, frequency up-conversion, etc, and then it is transmitted.

After the transmission of the wireless channel and the frequency down-conversion, analog to digital conversion, orthogonal frequency division multiplexing demodulation performed by the receiving end, the received sequence is the sequence R, R=($r_1$, $r_2$, $r_3$ . . . $r_N$), and the channel response corresponding to the received symbol $r_n$ is $H_n$ (n=1, 2 . . . N).

Firstly, it is to use $z_n$=$H_n$*$r_n$ to generate the channel compensation sequence Z, Z=($z_1$, $z_2$, $z_3$ . . . $z_N$).

Secondly, for Z=($z_1$, $z_2$, $z_3$ . . . $z_N$), according to one-to-one mapping relationships between $x_{2p-1}$, $x_{2p}$ and modulation symbols and one-to-one relationships between QPSK modulation information and modulation symbols, and it is to perform QPSK demodulation on the above sequence Z, and obtain a received sequence $\tilde{X}$, $\tilde{X}$=($\tilde{x}_1$, $\tilde{x}_2$, $\tilde{x}_3$, . . . $\tilde{x}_{2n}$) corresponding to a transmitted sequence X.

Subsequently, it is to perform reverse processing from the DCI to the sequence X on the sequence $\tilde{X}$, and obtain the received DCI.

Then, it is to select elements $\tilde{x}_{2p-1}$, $\tilde{x}_{2p}$ (p∈[1,48]) corresponding to pairing elements $x_{2p-1}$, $x_{2p}$ (p∈[1,48]) of the transmitting end from the sequence $\tilde{X}$, assuming that a received compensation symbol $r_p$ corresponding to $\tilde{x}_{2p-1}$, $\tilde{x}_{2p}$ (p∈[1,48]) is in the ith quadrant, the real part of $r_p$ is Re{$r_p$}, and the imaginary part of $r_p$ is Im{r}, and to perform a coordinate conversion based on a central symmetry point of the quadrant on Re{u}Im{u}:

$$\text{Re}\{u_p\} = \text{Re}\{r_p\} - |H_p|^2 \frac{\alpha_{i,1} + \alpha_{i,2}}{2}$$

$$\text{Im}\{u_p\} = \text{Im}\{r_p\} - |H_p|^2 \frac{\beta_{i,1} + \beta_{i,2}}{2}.$$

Lastly, it is to perform a BPSK demodulation on $u_p$, according to mapping relationships between constellation points in the quadrant i and modulation information, and obtain a received sequence $\tilde{Y}$, $\tilde{Y}$=($\tilde{y}_1$, $\tilde{y}_2$, $\tilde{y}_3$, . . . $\tilde{y}_L$), corresponding to a sequence Y to be modulated of the transmitting end. It is to perform reverse processing from information B to the sequence Y on the sequence $\tilde{Y}$, and obtain the received information $\tilde{B}$.

In the embodiment, when the downlink control information is transferred, the method for carrying new control information described in the embodiment of the present invention is adopted, in this method, under the premise of not increasing the overhead of the downlink control information, the new control information and the downlink control information can be simultaneously transmitted to the receiving end, and the same resources with the related information are used, which can better ensure high reliability transmission of the new control information, and while the receiving end can reuse the method in the related art to detect the related control information. Moreover, L=48 described in the embodiment of the present invention is just an example, the transmitter can select the value of L reasonably according to factors such as channel environment, etc., which can ensure to achieve a commendable trade-off in the aspects of performances of the new control information and the related control information.

Embodiment 5

The transmitter uses the PCFICH to transmit the control format indicator (CFI) information and transmit new control information B simultaneously. Firstly, the transmitter performs the operations such as encoding, repeating, etc., to generate a sequence X, $X=(x_1, x_2, x_3, \ldots x_{2N})$ to be modulated, at this point, information encoding generates information of 32 bits, N=16. It is to perform processing, such as channel coding etc., on the information B to generate a sequence Y, $Y=(y_1, y_2, y_3, \ldots y_L)$ to be modulated, at this point, L=32, that is, L=2N. For the related information of a corresponding control channel bearing information B (e.g. PCFICH is used instead of other control channels, or which resources on two control channels the information B is born on, etc.), the following rule for selecting pairing elements and the rule for mapping element groups to constellation points, the transmitting end adopts a certain predefined rule which is same with that of the receiving end. Moreover, the information of L length is notified to the receiving end in advance through other control signalings.

The transmitter orderly selects two elements $y_{2m-1}$, $y_{2m}$ (m=1, 2 ... L/2, L=2N) from the sequence Y, and selects pairing elements $x_{2p-1}$, $x_{2p}$ (p∈[1,N]) from the sequence X. At this point, assuming that the pairing elements are selected according to the mapping relationship of p=m. $y_{2m-1}$, $y_{2m}$ and $x_{2p-1}$, $x_{2p}$ are grouped into an element group $(x_{2p-1}, x_{2p}, y_{2m-1}, y_{2m})$, and $(x_{2p-1}, x_{2p}, y_{2m-1}, y_{2m})$ are mapped as specified constellation points of specified constellation diagram. The constellation points can be taken as modulation symbols one-to-one corresponding to $(x_{2p-1}, x_{2p}, y_{2m-1}, y_{2m})$, the specified constellation diagram has the following features:
1. the constellation points are uniformly distributed in four quadrants.
2. there are four constellation points in each quadrant.
3. when there are four constellation points in the ith quadrant (i ∈ [1,4]), it is assumed that coordinates of the first constellation points are $(\alpha_{i,1}, \beta_{i,1})$, coordinates of the second constellation points are $s(\alpha_{i,2}, \beta_{i,2})$, coordinates of the third constellation points are $(\alpha_{i,3}, \beta_{i,3})$ and coordinates of the fourth constellation points are $(\alpha_{i,4}, \beta_{i,4})$. Coordinates of a central symmetry point $y_i$ of the ith quadrant (i∈[1,4]) are defined as $$\left(\frac{\alpha_{i,1}+\alpha_{i,2}+\alpha_{i,3}+\alpha_{i,4}}{4}, \frac{\beta_{i,1}+\beta_{i,2}+\beta_{i,3}+\beta_{i,4}}{4}\right).$$

Subsequently, it is to determine quadrants where the constellation points are located according to $x_{2p-1}$, $x_{2p}$·$x_{2p-1}$, $x_{2p}$ have one-to-one mapping relationships with quadrants where the constellation points are located: when $x_{2p-1}$, $x_{2p}$ are "10", the mapped constellation point is located in the first quadrant; when $x_{2p-1}$, $x_{2p}$ are "00", the mapped constellation point is located in the second quadrant; when $x_{2p-1}$, $x_{2p}$ are "01", the mapped constellation point is located in the third quadrant; when $x_{2p-1}$, $x_{2p}$ are "11", the mapped constellation point is located in the fourth quadrant.

Secondly, it is to determine the constellation points of the quadrant i i∈[1,4] where constellation points are located according to $y_{2m-1}$, $y_{2m}$·$y_{2m-1}$, $y_{2m}$ have one-to-one mapping relationships with the constellation points in each quadrant: when $y_{2m-1}$, $y_{2m}$ are "00", they can be mapped as the first constellation point in the quadrant i, and the coordinates are $(\alpha_{i,1}, \beta_{i,1})$; when $y_{2m-1}$, $y_{2m}$ are "01", they can be mapped as the second constellation point in the quadrant i, and the coordinates are $(\alpha_{i,2}, \beta_{i,2})$; when $y_{2m-1}$, $y_{2m}$ are "11", they can be mapped as the third constellation point in the quadrant i, and the coordinates are $(\alpha_{i,3}, \beta_{i,3})$; when $y_{2m-1}$, $y_{2m}$ are "10", they can be mapped as the fourth constellation point in the quadrant i, and the coordinates are $(\alpha_{i,4}, \beta_{i,4})$. At this point, coordinates of the central symmetry point $y_i$ of the ith quadrant are $$\left(\frac{\alpha_{i,1}+\alpha_{i,2}+\alpha_{i,3}+\alpha_{i,4}}{4}, \frac{\beta_{i,1}+\beta_{i,2}+\beta_{i,3}+\beta_{i,4}}{4}\right),$$

and the above constellation points are in a central symmetry for the central symmetry point $y_i$.

Subsequently, the above modulation symbols are mapped to the resources of the above PCFICH and transmitted, the steps for transmitting wireless signals such as orthogonal frequency division multiplexing modulation, digital to analog conversion, frequency up-conversion, etc., may be performed before they are transmitted.

After the transmission of the wireless channel, and the frequency down-conversion, analog to digital conversion, orthogonal frequency division multiplexing demodulation performed by the receiving end, the received sequence is the sequence R, $R=(r_1, r_2, r_3 \ldots r_N)$, and the channel response corresponding to the received symbol $r_n$ is $H_n$ (n=1, 2 ... N).

Firstly, it is to use $z_n = H_n^* r_n$ to generate the channel compensation sequence Z, $Z=(z_1, z_2, z_3 \ldots z_N)$.

Secondly, for $Z=(z_1, z_2, z_3 \ldots z_N)$, according to one-to-one mapping relationships between $x_{2p-1}$, $x_{2p}$ and modulation symbols and one-to-one relationships between QPSK modulation information and modulation symbols, and it is to perform QPSK demodulation on the above sequence Z, and obtain a received sequence $\tilde{X}$, $\tilde{X}=(\tilde{x}_1, \tilde{x}_2, \tilde{x}_3, \ldots \tilde{x}_{2n})$ corresponding to a transmitted sequence X.

Subsequently, it is to perform reverse processing from the CFI to the sequence X on the sequence $\tilde{X}$, and obtain the received CFI information.

Then, it is to select elements $\tilde{x}_{2p-1}$, $\tilde{x}_{2p}$ (p∈[1,N]) corresponding to pairing elements $x_{2p-1}$, $x_{2p}$ (p∈[1,N]) of the transmitting end from the sequence $\tilde{X}$, assuming that the received compensation symbol $r_p$ corresponding to $\tilde{x}_{2p-1}, \tilde{x}_{2p}$ p∈[1,N] is in the ith quadrant, a real part of $r_p$ is Re$\{r_p\}$, and an imaginary part of $r_p$ is Im$\{i\}_1$, and to perform a coordinate conversion based on a central symmetry point of the quadrant on Re$\{u\}$Im$\{u\}$:

$$\text{Re}\{u_p\} = \text{Re}\{r_p\} - |H_p|^2 \frac{\alpha_{i,1}+\alpha_{i,2}+\alpha_{i,3}+\alpha_{i,4}}{4}$$

$$\text{Im}\{u_p\} = \text{Im}\{r_p\} - |H_p|^2 \frac{\beta_{i,1}+\beta_{i,2}+\beta_{i,3}+\beta_{i,4}}{4}$$

Lastly, it is to perform QPSK demodulation in the quadrant i on $u_p$ according to mapping relationships between constellation point in the quadrant i and modulation information, and obtain a received sequence $\tilde{Y}$, $\tilde{Y}=(\tilde{y}_1, \tilde{y}_2, \tilde{y}_3, \ldots \tilde{y}_L)$ corresponding to a sequence Y to be modulated of the transmitting end. At this point, since the mapping relationships between the constellation points in different quadrants and the modulation information may be different, it causes that the QPSK demodulation in different quadrants may be different. It is to perform reverse processing from the information B to the sequence Y on the sequence $\tilde{Y}$, and obtain the received information $\tilde{B}$.

In the embodiment, when the control format is transferred, the method for carrying new control information described in the embodiment of the present invention is adopted, in this method, under the premise of not increasing the overhead of the downlink control information, the new control information and the downlink control information can be simultaneously transmitted to the receiving end, and the same resources with the related information are used, which can better ensure high reliability transmission of the new control information, and while the receiving end can reuse the method in the related art to detect the related control information. Without loss of generality, the transmitting end can also use resources of multiple PCFICHs to carry the new control information, which can improve the detection performance of the new control information, and at same time, the above advantages are kept.

Embodiment 6

The transmitter uses the PBCH to transmit the master information block (MIB) and transmit the new control information B simultaneously. Firstly, the transmitter performs operations such as CRC adding, coding and interleaving and rate matching, etc., on the MIB information to be transmitted, according to the protocol of the related art, generating a bit sequence X, $X=(x_1, x_2, x_3, \ldots x_{2n})$ to be modulated, at this point, the MIB information occupy four subframes in the period of 40 ms, which are total 960 RE resources, N=960. It is to perform processing, such as channel coding etc., on the information B to generate a sequence Y, $Y=(y_1, y_2, y_3, \ldots y_L)$ to be modulated, at this point, L=100. That is, L<2N, the new control information B only occupies part of resources used by the DCI. For the related information of a corresponding control channel bearing information B (e.g. PBCH is used instead of other control channels, or which resources on the control channel the information B is born on, etc.), the following rule for selecting pairing elements and the rule for mapping element groups to constellation points, the transmitting end adopts a certain predefined rule which is same with that of the receiving end.

Moreover, the information of L length is notified to the receiving end in advance through other control signalings.

The transmitter orderly selects one element $y_n$ (m=1, 2 . . . L, L=100) from the sequence Y, and selects pairing elements $x_{2p-1}$, $x_{2p}$ (p∈[1,N]) from the sequence X. At this point, assuming that the pairing elements are selected according to the mapping relationship of p=m. y, and $x_{2p-1}$, $x_{2p}$ are grouped into an element group $(x_{2p-1}, x_{2p}, y_n)$, and $(x_{2p-1}, x_{2p}, y_n)$ are mapped as specified constellation points of specified constellation diagram. The constellation points can be taken as modulation symbols one-to-one corresponding to $(x_{2p-1}, x_{2p}, y_n)$. The specified constellation diagram has the following features:

1. the constellation points are uniformly distributed in four quadrants.
2. there are two constellation points in each quadrant.
3. when there are two constellation points in the ith quadrant (i=1, 2, 3, 4), assuming that coordinates of the first constellation point are $(\alpha_{i,1}, \beta_{i,1})$, coordinates of the second constellation point are $(\alpha_{i,2}, \beta_{i,2})$, coordinates of a central symmetry point $y_i$ of the ith quadrant (i∈[1,4]) are defined as $$\left(\frac{\alpha_{i,1}+\alpha_{i,2}}{2}, \frac{\beta_{i,1}+\beta_{i,2}}{2}\right),$$

and the above constellation points are in a central symmetry for the central symmetry point $y_i$.

Firstly, it is to determine quadrants where the constellation points are located according to $x_{2p-1}$, $x_{2p}$. $x_{2p-1}$, $x_{2p}$ have one-to-one mapping relationships with quadrants where the constellation points are located: when $x_{2p-1}$, $x_{2p}$ are "11", the mapped constellation point is located in the first quadrant; when $x_{2p-1}$, $x_{2p}$ are "10", the mapped constellation point is located in the second quadrant; when $x_{2p-1}$, $x_{2p}$ are "00", the mapped constellation point is located in the third quadrant; when $x_{2p-1}$, $x_{2p}$ are "01", the mapped constellation point is located in the fourth quadrant.

Secondly, it is to determine the constellation points of the quadrant i where constellation points are located according to $y_n \cdot y_n$ has one-to-one mapping relationship with the constellation points in ith quadrant i∈[1,4]: when $y_n$ is "0", it is mapped as the first constellation point in the quadrant i, and coordinates are $(\alpha_{i,1}, \beta_{i,1})$; when $y_n$ is "1", it is mapped as the second constellation point in the quadrant i, and coordinates are $(\alpha_{i,2}, \beta_{i,2})$. At this point, coordinates of the central symmetry point $y_i$ of the ith quadrant are $$\left(\frac{\alpha_{i,1}+\alpha_{i,2}}{2}, \frac{\beta_{i,1}+\beta_{i,2}}{2}\right),$$

and the above constellation points are in a central symmetry for the central symmetry point $y_i$. Moreover, when the quadrants determined by $x_{2p-1}$, $x_{2p}$ are different, the one-to-one mapping relationships between $y_n$ and the constellation points in the quadrant are different. There are some elements in the sequence X not used for pairing elements $x_{2p-1}$, $x_{2p}$, p∈[101,N], it is to take two of them as one element group $x_{2p-1}$, $x_{2p}$ to perform QPSK modulation, modulating into QPSK modulation symbols.

Subsequently, the above modulation symbols are mapped to the resources of the above PBCH and transmitted, the steps for transmitting wireless signals such as orthogonal frequency division multiplexing modulation, digital to analog conversion, frequency up-conversion, etc., may be performed before they are transmitted.

After the transmission of the wireless channel, and the frequency down-conversion, analog to digital conversion, orthogonal frequency division multiplexing demodulation performed by the receiving end, the received sequence is the sequence R, $R=(r_1, r_2, r_3 \ldots r_N)$, and the channel response corresponding to the received symbol $r_n$ is $H_n$ (n=1, 2 . . . N).

Firstly, it is to use $z_n=H_n^* r_n$ to generate the channel compensation sequence Z, $Z=(z_1, z_2, z_3 \ldots z_N)$.

Secondly, for $Z=(z_1, z_2, z_3 \ldots z_N)$, according to one-to-one mapping relationships between $x_{2p-1}$, $x_{2p}$ and modulation symbols and one-to-one relationships between QPSK modulation information and modulation symbols, and it is to perform QPSK demodulation on the above sequence Z, and obtain a received sequence $\tilde{X}$, $\tilde{X}=(\tilde{x}_1, \tilde{x}_2, \tilde{x}_3, \ldots \tilde{x}_{2n})$ corresponding to a transmitted sequence X.

Subsequently, it is to perform reverse processing from the MIB information to the sequence X on the sequence $\tilde{X}$, and obtain the received MIB information.

Then, it is to select elements $\tilde{x}_{2p-1}$, $\tilde{x}_{2p}$ (p∈[1,100]) corresponding to pairing elements $x_{2p-1}$, $x_{2p}$ of the transmitting end from the sequence $\tilde{X}$, assuming that a received compensation symbol $r_p$ corresponding to $\tilde{x}_{2p-1}$, $\tilde{x}_{2p}$ (p∈[1,100]) is in the ith (i∈[1,4]) quadrant, a real part of $r_p$ is $\text{Re}\{r_p\}$, and an imaginary part of $r_p$ is Im$\{r_p\}$, and to perform a coordinate conversion based on a central symmetry point of the quadrant on Re$\{u\}$Im$\{u\}$:

$$\text{Re}\{u_p\} = \text{Re}\{r_p\} - |H_p|^2 \frac{\alpha_{i,1} + \alpha_{i,2}}{2}$$

$$\text{Im}\{u_p\} = \text{Im}\{r_p\} - |H_p|^2 \frac{\beta_{i,1} + \beta_{i,2}}{2}.$$

Lastly, it is to perform a BPSK demodulation on $u_p$ according to mapping relationships between constellation point in the quadrant i and modulation information, and obtain a received sequence $\tilde{Y}$, $\tilde{Y}=(\tilde{y}_1, \tilde{y}_2, \tilde{y}_3, \ldots \tilde{y}_L)$ corresponding to a sequence Y to be modulated of the transmitting end. It is to perform reverse processing from the information B to the sequence Y on the sequence $\tilde{Y}$, and obtain the received information $\tilde{B}$.

In the embodiment, when the MIB information is transferred, the method for carrying new control information described in the embodiment of the present invention is adopted, in this method, under the premise of not increasing the overhead of the downlink control information, the new control information and the downlink control information can be simultaneously transmitted to the receiving end, and the same resources with the related information are used, which can better ensure high reliability transmission of the new control information, and while the receiving end can reuse the method in the related art to detect the related control information. Without loss of generality, the transmitting end can also use all resources of one PBCH or even the resources of multiple PBCHs to carry the new control information, which can improve the detection performance of the new control information, and at same time, the above advantages are kept.

Embodiment 7

Figure 6:
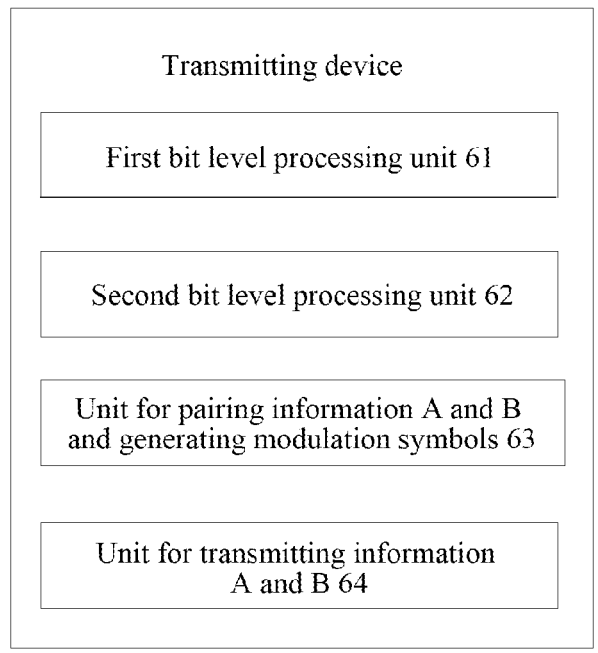
FIG. 6 is a schematic diagram of a structure of a transmitting device according to the embodiment of the present invention.

The embodiment of the present invention provides a device for transmitting control information, and as shown in FIG. 6, the device comprises various units as follows: a first bit level processing unit 61, a second bit level processing unit 62, a unit for pairing information A and B and generating modulation symbols 63 and a unit for transmitting information A and B 64.

The first bit level processing unit 61 is configured to generate a bit stream sequence X to be modulated corresponding to control information A, and include all processing before modulation;

the second bit level processing unit 62 is configured to generate a bit stream sequence Y to be modulated corresponding to control information B newly added, and include all processing before modulation; and a unit for pairing information A and B and generating modulation symbols 63 is configured to, map $(x_{2p-1}, x_{2p}, y_n)$ and $(x_{2p-1}, x_{2p}, y_{2m-1}, y_{2m})$ as constellation points of a specified constellation diagram to determine modulation symbols corresponding to $(x_{2p-1}, x_{2p}, y_n)$ or $(x_{2p-1}, x_{2p}, y_{2m-1}, y_{2m})$ according to a form of $(x_{2p-1}, x_{2p}, y_n)$ or a form of $(x_{2p-1}, x_{2p}, y_{2m-1}, y_{2m})$, and take every two elements in the elements of the sequence X which are not used for pairing, perform a QPSK modulation to generate QPSK modulation symbols.

Wherein, the value of p is uniquely determined according to the value of n or m, and for different $y_n$ or $y2_{m-1}, y_{2m}$, its pairing element is also different.

The specified constellation diagram meets the following conditions:

the constellation points are uniformly distributed in four quadrants;

when an element group is in a form of $(x_{2p-1}, x_{2p}, y_n)$, there are two constellation points in each quadrant; when an element is in a form of $(x_{2p-1}, x_{2p}, y_{2m-1}, y_{2m})$, there are four constellation points in each quadrant;

when there are four constellation points in an ith quadrant, it is assumed that coordinates of a first constellation point are $(\alpha_{i,1}, \beta_{i,1})$, coordinates of a second constellation point are $(\alpha_{i,2}, \beta_{i,2})$, coordinates of a third constellation point are $(\alpha_{i,3}, \beta_{i,3})$, coordinates of a fourth constellation point are $(\alpha_{i,4}, \beta_{i,4})$, and coordinates of a central symmetry point $y_i$ of the ith quadrant are defined as $$\left(\frac{\alpha_{i,1} + \alpha_{i,2} + \alpha_{i,3} + \alpha_{i,4}}{4}, \frac{\beta_{i,1} + \beta_{i,2} + \beta_{i,3} + \beta_{i,4}}{4}\right),$$

and when there are two constellation points in the ith quadrant, it is assumed that coordinates of a first constellation point are $(\alpha_{i,1}, \beta_{i,1})$, coordinates of a second constellation point are $(\alpha_{i,2}, \beta_{i,2})$, and coordinates of a central symmetry point $y_i$ of the ith quadrant are defined as $$\left(\frac{\alpha_{i,1} + \alpha_{i,2}}{2}, \frac{\beta_{i,1} + \beta_{i,2}}{2}\right),$$

and the constellation points are in a central symmetry for the central symmetry point, i$\in$[1,4].

The unit for pairing information A and B and generating modulation symbols 63, is configured to map $(x_{2p-1}, x_{2p}, y_n)$ or $(x_{2p-1}, x_{2p}, y_{2m-1}, y_{2m})$ as constellation points of a specified constellation diagram in the following ways that:

it is to determine quadrants where the constellation points are located according to $x_{2p-1}, x_{2p}$, wherein, $x_{2p-1}, x_{2p}$ have one-to-one mapping relationships with quadrants where the constellation points are located; or it is to determine constellation points of a quadrant where constellation points are located according to $y_n$ or $y_{2m-1}, y_{2m}$, wherein, $y_n$ or $y_{2m-1}, y_{2m}$ has one-to-one mapping relationships with the constellation points in each quadrant.

The operations of the above mapping process can refer to the contents of the embodiments 1 to 6, which will not be described repeatedly here.

a unit for transmitting information A and B 64 is configured to map the modulation symbols generated by the unit for pairing information A and B and generating modulation symbols to a part of or all resources occupied by a related control channel to be transmitted.

Embodiment 8

Figure 7:
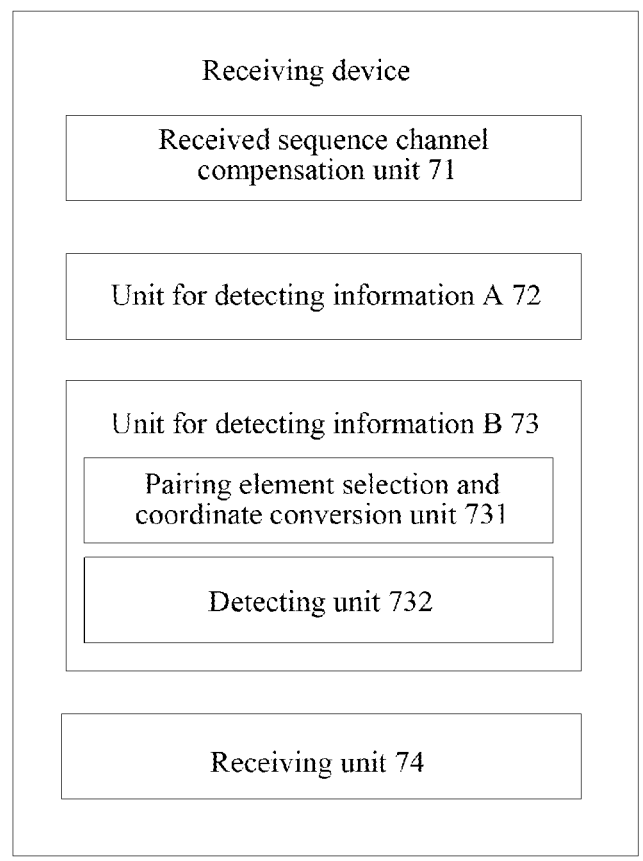
FIG. 7 is a schematic diagram of a structure of a receiving device according to the embodiment of the present invention.

The embodiment of the present invention provides a device for receiving control information, and as shown in FIG. 7, the device comprises various units as follows.

a received sequence channel compensation unit 71, is configured to use a estimated channel response to perform a channel compensation on a received sequence R, obtain a channel response $H_n$, wherein, n=1, 2 . . . N, and use $z_n = H_n^* r_n$ to generate a channel compensation sequence Z, wherein, $Z=(z_1, z_2, z_3 \ldots z_N)$, and according to one-to-one mapping relationships between $x_{2p-1}, x_{2p}$ and modulation symbols and one-to-one relationships between QPSK modulation information and modulation symbols, perform QPSK demodulation on the above sequence Z, and obtain a received sequence $\tilde{X}$, $\tilde{X}=(\tilde{x}_1, \tilde{x}_2, \tilde{x}_3, \ldots \tilde{x}_{2n})$, corresponding to the transmitted sequence X;

a unit for detecting information A 72, is configured to perform reverse processing from control information A to a sequence X on a sequence $\tilde{X}$, and obtain received information $\tilde{A}$; and a unit for detecting information B 73, is configured to detect control information B newly added according to the sequence $\tilde{X}$.

The above unit for detecting information B 73 is divided into various parts as follows:

a pairing element selection and coordinate conversion unit 731 is configured to, select elements $\tilde{x}_{2p-1}$, $\tilde{x}_{2p}$ corresponding to pairing elements $x_{2p-1}$, $x_{2p}$ of the transmitting end from the sequence $\tilde{X}$, if a received compensation symbol r corresponding to $\tilde{x}_{2p-1}$, $\tilde{x}_{2p}$ is in an ith quadrant, a real part of $r_p$ is $\text{Re}\{r_p\}$, and an imaginary part of $r_p$ is $\text{Im}\{r_p\}$, $p \in [1,2N]$, perform a coordinate conversion based on a central symmetry point of the ith quadrant on $\text{Re}\{u\}\text{Im}\{u\}$:

when there are four constellation points in one quadrant:

$$\text{Re}\{u_p\} = \text{Re}\{r_p\} - |H_p|^2 \frac{\alpha_{i,1} + \alpha_{i,2} + \alpha_{i,3} + \alpha_{i,4}}{4}$$

$$\text{Im}\{u_p\} = \text{Im}\{r_p\} - |H_p|^2 \frac{\beta_{i,1} + \beta_{i,2} + \beta_{i,3} + \beta_{i,4}}{4},$$

it is to perform a QPSK demodulation on $u_p$ according to mapping relationships between constellation points in the quadrant i and modulation information, and obtain a received sequence $\tilde{Y}$ corresponding to a sequence Y to be modulated of the transmitting end, wherein, $\tilde{Y}=(\tilde{y}_1, \tilde{y}_2, \tilde{y}_3, \ldots \tilde{y}_L)$;

when there are two constellation points in one quadrant:

$$\text{Re}\{u_p\} = \text{Re}\{r_p\} - |H_p|^2 \frac{\alpha_{i,1} + \alpha_{i,2}}{2}$$

$$\text{Im}\{u_p\} = \text{Im}\{r_p\} - |H_p|^2 \frac{\beta_{i,1} + \beta_{i,2}}{2},$$

it is to perform a BPSK demodulation on $u_p$ according to mapping relationships between constellation points in the quadrant i and modulation information, and obtain a received sequence $\tilde{Y}$ corresponding to a sequence Y to be modulated of the transmitting end, wherein, $\tilde{Y}=(\tilde{y}_1, \tilde{y}_2, \tilde{y}_3, \ldots \tilde{y}_L)$; and a detecting unit 732, is configured to perform reverse processing from the control information B newly added to the sequence Y on the sequence $\tilde{Y}$, and obtain the received control information $\tilde{B}$.

The other operations of the above pairing element selection and coordinate conversion unit 731 can refer to the contents of the embodiments 1 to 6, which will not be described repeatedly here.

Moreover, the above receiving device may further comprise a receiving unit 74, which is configured to receive a signaling transmitted by the transmitted end, wherein, the signaling carries a part of or all related information of control information B newly added.

The related information of the control information B newly added at least include related information of a corresponding control channel, information of L length, a rule for selecting pairing elements and a rule for mapping element groups to constellation points.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or some of the steps of the abovementioned embodiment can also be implemented with one or more integrated circuits. Accordingly, each module/unit in the abovementioned embodiment may be realized in the form of hardware or software functional modules. The present application is not limited to any particular form of a combination of hardware and software.

The above description is merely preferable embodiments of the present invention, instead of limiting the protection scope of the patent document. Any modification, equivalent substitution, improvement etc., which is made within the spirit and principle of the embodiments of the present invention, should be included in the protection scope of the appended claims of patent document.

INDUSTRIAL APPLICABILITY

In the technical scheme of the present application, the problems that using the ePDCCH to transmit new information has great limitations and there is no effective method for using the PCFICH, PBCH to carry the new control information in the related art have been solved.

What is claimed is:

1. A method for transferring control information, comprising:

a transmitting end generating a bit stream sequence X to be modulated corresponding to control information A, and generating a bit stream sequence Y to be modulated corresponding to new control information B, orderly selecting one element $y_n$ or two elements $y_{2m-1}$, $y_{2m}$, from the sequence Y to be modulated corresponding to the new control information B, wherein, n=1... L, L≤N, m=1... L/2, L is a even number and meets L≤2N, N is a number of modulation symbols bearing the control information A, and L is a length of the sequence Y to be modulated, then selecting pairing elements $x_{2p-1}$, $x_{2p}$ from the sequence X to be modulated corresponding to the control information A, grouping $y_n$ or $y_{2m-1}$, $y_{2m}$ and $x_{2p-1}$, $x_{2p}$, into an element group ($x_{2p-1}$, $x_{2p}$, $y_n$) or ($x_{2p-1}$, $x_{2p}$, $y_{2m-1}$, $y_{2m}$), and mapping ($x_{2p-1}$, $x_{2p}$, $y_n$) or ($x_{2p-1}$, $x_{2p}$, $y_{2m-1}$, $y_{2m}$) as specified constellation points of a specified constellation diagram, and taking the constellation points as modulation symbols that one-to-one correspond to ($x_{2p-1}$, $x_{2p}$, $y_n$) or ($x_{2p-1}$, $x_{2p}$, $y_{2m-1}$, $y_{2m}$), wherein, $p \in [1, N]$;

taking every two elements in the sequence X, which are not selected as the pairing elements, as one element group to perform a quaternary phase shift keying (QPSK) modulation, to modulate into QPSK modulation symbols; and mapping the constellation points and the QPSK modulation symbols to a part of or all resources occupied by a corresponding control channel to be transmitted.

2. The method of claim 1, wherein, the value of p is uniquely determined according to the value of n or m, and for different $y_n$ or $y_{2m-1}$, $y_{2m}$, pairing elements are also different.

3. The method according to claim 1, wherein, in the specified constellation diagram:

the constellation points are uniformly distributed in four quadrants;

when an element group is in a form of ($x_{2p-1}$, $x_{2p}$, $y_n$), there are two constellation points in each quadrant;

when an element group is in a form of ($x_{2p-1}$, $x_{2p}$, $y_{2m-1}$, $y_{2m}$), there are four constellation points in each quadrant;

when there are four constellation points in an ith quadrant, assuming that coordinates of a first constellation point are ($\alpha_{i,1}$, $\beta_{i,1}$), coordinates of a second constellation point are ($\alpha_{i,2}$, $\beta_{i,2}$), coordinates of a third constellation point are ($\alpha_{i,3}$, $\beta_{i,3}$) and coordinates of a fourth constellation point are ($\alpha_{i,4}$, $\beta_{i,4}$), coordinates of a central symmetry point $y_i$ of the ith quadrant are defined as $$\left( \frac{\alpha_{i,1} + \alpha_{i,2} + \alpha_{i,3} + \alpha_{i,4}}{4}, \frac{\beta_{i,1} + \beta_{i,2} + \beta_{i,3} + \beta_{i,4}}{4} \right),$$

and when there are two constellation points in the ith quadrant, assuming that coordinates of a first constellation point are ($\alpha_{i,1}$, $\beta_{i,1}$) and coordinates of a second constellation point are ($\alpha_{i,2}$, $\beta_{i,2}$) coordinates of a central symmetry point $y_i$ of the ith quadrant are defined as $$\left( \frac{\alpha_{i,1} + \alpha_{i,2}}{2}, \frac{\beta_{i,1} + \beta_{i,2}}{2} \right),$$

and the constellation points are in a central symmetry for the central symmetry point $y_i$, $i \in [1,4]$.

4. The method of claim 3, wherein, the transmitting end mapping ($x_{2p-1}$, $x_{2p}$, $y_n$) or ($x_{2p-1}$, $x_{2p}$, $y_{2m-1}$, $y_{2m}$) as specified constellation points of a specified constellation diagram comprises:

determining quadrants where the constellation points are located according to $x_{2p-1}$, $x_{2p}$, wherein, $x_{2p-1}$, $x_{2p}$ have one-to-one mapping relationships with quadrants where the constellation points are located; and determining constellation points of quadrants where constellation points are located according to $y_n$ or $y_{2m-1}$, $y_{2m}$, wherein, $y_n$ or $y_{2m-1}$, $y_{2m}$ have one-to-one mapping relationships with constellation points in each quadrant.

5. The method of claim 3, further comprising:

the transmitting end notifying related information of the new control information B to a receiving end through a signaling; or the transmitting end agreeing on same related information of the new control information B with the receiving end in advance; or the transmitting end agreeing on a part of information in related information of the new control information B with the receiving end in advance, and notifying remaining information in the related information of the new control information B to the receiving end through a signaling.

6. The method of claim 5, wherein, the related information of the new control information B at least includes related information of a corresponding control channel, information of length L, a rule for selecting pairing elements and a rule for mapping element groups to constellation points.

7. The method of claim 1, further comprising:

a receiving end performing a wireless signal processing operation on a received sequence R, R=($r_1$, $r_2$, $r_3$ $r_N$), wherein, n=1, 2 ... N, obtaining a channel response $H_n$ corresponding to a symbol $r_n$, wherein, n=1, 2 ... N;

using $z_n = H^*_n r_n$ to generate a channel compensation sequence Z, wherein, Z=($z_1$, $z_2$, $z_3$ $z_N$);

for Z=($z_1$, $z_2$, $z_3$ $z_N$), according to one-to-one mapping relationships between $x_{2p-1}$, $x_{2p}$ and modulation symbols and one-to-one relationships between quaternary phase shift keying (QPSK) modulation information and modulation symbols, performing QPSK demodulation on the above sequence Z, and obtaining a received sequence X, X=($x_1$, $x_2$, $x_3$, $x_{2n}$) corresponding to a transmitted sequence X;

performing reverse processing from control information A to the sequence X on the sequence X, and obtaining received control information A; and detecting new control information B according to the sequence X.

8. The method according to claim 7, wherein, the receiving end detecting the new control information B comprises:

selecting elements $x_{2p-1}$, $x_{2p}$ corresponding to pairing elements $x_{2p-1}$, $x_{2p}$ of a transmitting end from the sequence X, if a received compensation symbol $r_p$ corresponding to $x_{2p-1}$, $x_{2p}$ is in an ith quadrant, a real part of $r_p$ is Re$\{r_p\}$, and an imaginary part of $r_p$ is Im$\{r_p\}$, p$\in$[1,2N], performing a coordinate conversion based on a central symmetry point of the ith quadrant on Re$\{u\}$ Im$\{u\}$:

when there are four constellation points in the ith quadrant, assuming that coordinates of a first constellation point are ($\alpha_{i,1}$, $\beta_{i,1}$), coordinates of a second constellation point are ($\alpha_{i,2}$, $\beta_{i,2}$), coordinates of a third constellation point are ($\alpha_{i,3}$, $\beta_{i,3}$) and coordinates of a fourth constellation point are ($\alpha_{i,4}$, $\beta_{i,4}$), then:

$$\text{Re}\{u_p\} = \text{Re}\{r_p\} - |H_p|^2 \frac{\alpha_{i,1} + \alpha_{i,2} + \alpha_{i,3} + \alpha_{i,4}}{4}$$

$$\text{Im}\{u_p\} = \text{Im}\{r_p\} - |H_p|^2 \frac{\beta_{i,1} + \beta_{i,2} + \beta_{i,3} + \beta_{i,4}}{4},$$

performing QPSK demodulation on $u_p$ according to mapping relationships between constellation points in the quadrant i and modulation information, and obtaining a received sequence Y corresponding to a sequence Y to be modulated of the transmitting end, wherein, Y=($y_1$, $y_2$, $y_3$, $y_L$);

when there are two constellation points in the ith quadrant, assuming that coordinates of a first constellation point are ($\alpha_{i,1}$, $\beta_{i,1}$) and coordinates of a second constellation point are ($\alpha_{i,2}$, $\beta_{i,2}$), then:

$$\text{Re}\{u_p\} = \text{Re}\{r_p\} - |H_p|^2 \frac{\alpha_{i,1} + \alpha_{i,2}}{2}$$

$$\text{Im}\{u_p\} = \text{Im}\{r_p\} - |H_p|^2 \frac{\beta_{i,1} + \beta_{i,2}}{2},$$

performing a binary phase shift keying (BPSK) demodulation on $u_p$ according to mapping relationships between constellation points in the quadrant i and modulation information, and obtaining a received sequence Y corresponding to the sequence Y to be modulated of the transmitting end, wherein, Y=($y_1$, $y_2$, $y_3$, $y_L$); and performing reverse processing from the new control information B to the sequence Y on the sequence Y, and obtaining received control information B.

9. The method according to claim 7, further comprising:
the receiving end agreeing on same related information of the new control information B with the transmitting end in advance; or
the receiving end receiving a signaling transmitted by the transmitted end, wherein, the signaling carries a part of or all related information of the new control information B.

10. The method of claim 9, wherein,
the related information of the new control information B at least include related information of a corresponding control channel, information of length L, a rule for selecting pairing elements and a rule for mapping element groups to constellation points.

11. The method according to claim 8, further comprising:
the receiving end agreeing on same related information of control information B newly added with the transmitting end in advance; or
the receiving end receiving a signaling transmitted by the transmitted end, wherein, the signaling carries a part of or all related information of the control information B newly added.

12. A system for transferring control information, comprising a transmitting end and a receiving end, wherein the transmitting end is configured to:
generate a bit stream sequence X to be modulated corresponding to control information A, and generate a bit stream sequence Y to be modulated corresponding to new control information B, orderly select one element $y_n$ or two elements $y_{2m-1}$, $y_{2m}$ from the sequence Y to be modulated corresponding to the new control information B, wherein, n=1...L, L≤N, m=1...L/2, L is a even number and meets L≤2N, N is a number of modulation symbols bearing the control information A, and L is a length of the sequence Y to be modulated, then select pairing elements $x_{2p-1}$, $x_{2p}$ from the sequence X to be modulated corresponding to the control information A, grouping $y_n$ or $y_{2m-1}$, $y_{2m}$ and $x_{2p-1}$, $x_{2p}$ into an element group $(x_{2p-1}, x_{2p}, y_n)$ or $(x_{2p-1}, x_{2p}, y_{2m-1}, y_{2m})$, and map $(x_{2p-1}, x_{2p}, y_n)$ or $(x_{2p-1}, x_{2p}, x_{2p}, y_{2m-1}, y_{2m})$ as specified constellation points of a specified constellation diagram, and take the constellation points as modulation symbols that one-to-one correspond to $(x_{2p-1}, x_{2p}, y_n)$ or $(x_{2p-1}, x_{2p}, y_{2m-1}, y_{2m})$, wherein, p∈[1, N];
take every two elements in the sequence X, which are not selected as the pairing elements, as one element group to perform a quaternary phase shift keying (QPSK) modulation, to modulate into QPSK modulation symbols; and
map the constellation points and the QPSK modulation symbols to a part of or all resources occupied by a corresponding control channel to be transmitted.

13. The system of claim 12, wherein the transmitting end comprises hardware configured to execute instructions stored in a non-transitory computer readable medium to perform steps in following units:
a first bit level processing unit, configured to generate the bit stream sequence X to be modulated corresponding to the control information A, and include all processing before modulation;
a second bit level processing unit, configured to generate the bit stream sequence Y to be modulated corresponding to the new control information B, and include all processing before modulation;
a unit for pairing the information A and B and generating modulation symbols, configured to, map $(x_{2p-1}, x_{2p}, y_n)$ or $(x_{2p-1}, x_{2p}, y_{2m-1}, y_{2m})$ as constellation points of a specified constellation diagram to determine modulation symbols corresponding to $(x_{2p-1}, x_{2p}, y_n)$ or $(x_{2p-1}, x_{2p}, y_{2m-1}, y_{2m})$ according to a form of $(x_{2p-1}, x_{2p}, y_n)$ or a form of $(x_{2p-1}, x_{2p}, y_{2m-1}, y_{2m})$, and take every two elements in the sequence X, which are not selected as the pairing elements, as one element group to perform a quaternary phase shift keying (QPSK) modulation to generate QPSK modulation symbols; and
a unit for transmitting the information A and B, configured to map the modulation symbols generated by the unit for pairing the information A and B and generating modulation symbols to a part of or all resources occupied by a corresponding control channel to be transmitted.

14. The system of claim 13, wherein, the value of p is uniquely determined according to the value of n or m, and for different $y_n$ or $y_{2m-1}$, $y_{2m}$, pairing element are also different.

15. The system of claim 13, wherein, in the specified constellation diagram:
the constellation points are uniformly distributed in four quadrants;
when an element group is in a form of $(x_{2p-1}, x_{2p}, y_n)$, there are two constellation points in each quadrant; when an element group is in a form of $(x_{2p-1}, x_{2p}, y_{2m-1}, y_{2m})$, there are four constellation points in each quadrant;
when there are four constellation points in an ith quadrant, assuming that coordinates of a first constellation point are $(\alpha_{i,1}, \beta_{i,1})$, coordinates of a second constellation point are $(\alpha_{i,2}, \beta_{i,2})$, coordinates of a third constellation point are $(\alpha_{i,3}, \beta_{i,3})$ and coordinates of a fourth constellation point are $(\alpha_{i,4}, \beta_{i,4})$, coordinates of a central symmetry point $y_i$ of the ith quadrant are defined as $$\left(\frac{\alpha_{i,1}+\alpha_{i,2}+\alpha_{i,3}+\alpha_{i,4}}{4}, \frac{\beta_{i,1}+\beta_{i,2}+\beta_{i,3}+\beta_{i,4}}{4}\right),$$

and when there are two constellation points in the ith quadrant, assuming that coordinates of a first constellation point are $(\alpha_{i,1}, \beta_{i,1})$ and coordinates of a second constellation point are $(\alpha_{i,2}, \beta_{i,2})$ coordinates of a central symmetry point $y_i$ of the ith quadrant are defined as $$\left(\frac{\alpha_{i,1}+\alpha_{i,2}}{2}, \frac{\beta_{i,1}+\beta_{i,2}}{2}\right),$$

and the constellation points are in a central symmetry for the central symmetry point $y_i$, i∈[1,4].

16. The system of claim 15, wherein the unit for pairing the information A and B and generating modulation symbols, is configured to map $(x_{2p-1}, x_{2p}, y_n)$ and $(x_{2p-1}, x_{2p}, y_{2m-1}, y_{2m})$ as specified constellation points of a specified constellation diagram in a following way:
determining quadrants where the constellation points are located according to $x_{2p-1}$, $x_{2p}$, wherein, $x_{2p-1}$, $x_{2p}$ have one-to-one mapping relationships with quadrants where the constellation points are located; and
determining constellation points of quadrants where constellation points are located according to $y_n$ or $y_{2m-1}$, $y_{2m}$, wherein, $y_n$ or $y_{2m-1}$, $y_{2m}$ have one-to-one mapping relationships with the constellation points in each quadrant.

17. The system of claim 12, wherein the receiving end comprises hardware configured to execute instructions stored in a non-transitory computer readable medium to perform steps in following units:
- a received sequence channel compensation unit configured to use a estimated channel response to perform a channel compensation on a received sequence R, obtain a channel response $H_n$, wherein n=1, 2. . . N, and use $z_n = H^*_n r_n$ to generate a channel compensation sequence Z, wherein $Z=(z_1, z_2, z_3 \ldots z_N)$, and according to one-to-one mapping relationships between $x_{2p-1}$, $x_{2p}$ and modulation symbols and one-to-one relationships between quaternary phase shift keying (QPSK) modulation information and modulation symbols, perform QPSK demodulation on the sequence Z, and obtain a received sequence X, $X=(x_1, x_2, x_3, x_{2n})$, corresponding to a transmitted sequence X;
- a unit for detecting information A, configured to perform reverse processing from control information A to the sequence X on the sequence X, and obtain received control information A; and
- a unit for detecting information B, configured to detect new control information B according to the sequence X.

18. The system according to claim 17, wherein, the unit for detecting information B comprises:
- a pairing element selection and coordinate conversion unit, configured to, select elements $x_{2p-1}$, $x_{2p}$ corresponding to pairing elements $x_{2p-1}$, $x_{2p}$ of a transmitting end from the sequence X, if a received compensation symbol $r_p$ corresponding to $x_{2p-1}$, $x_{2p}$ is in an ith quadrant, a real part of $r_p$ is $\mathrm{Re}\{r_p\}$, and an imaginary part of $r_p$ is $\mathrm{Im}\{r_p\}$, $p \in [1,2N]$, perform a coordinate conversion based on a central symmetry point of the ith quadrant on $\mathrm{Re}\{u\}$ $\mathrm{Im}\{u\}$:
- when there are four constellation points in the ith quadrant, assuming that coordinates of a first constellation point are $(\alpha_{i,1}, \beta_{i,1})$, coordinates of a second constellation point are $(\alpha_{i,2}, \beta_{i,2})$, coordinates of a third constellation point are $(\alpha_{i,3}, \beta_{i,3})$ and coordinates of a fourth constellation point are $(\alpha_{i,4}, \beta_{i,4})$, then:

$$\mathrm{Re}\{u_p\} = \mathrm{Re}\{r_p\} - |H_p|^2 \frac{\alpha_{i,1} + \alpha_{i,2} + \alpha_{i,3} + \alpha_{i,4}}{4}$$

-continued $$\mathrm{Im}\{u_p\} = \mathrm{Im}\{r_p\} - |H_p|^2 \frac{\beta_{i,1} + \beta_{i,2} + \beta_{i,3} + \beta_{i,4}}{4},$$

perform QPSK demodulation on $u_p$ according to mapping relationships between constellation points in the quadrant i and modulation information, and obtain a received sequence Y corresponding to a sequence Y to be modulated of the transmitting end, wherein $Y=(y_1, y_2, y_3, y_L)$;

when there are two constellation points in the ith quadrant, assuming that coordinates of a first constellation point are $(\alpha_{i,1}, \beta_{i,1})$ and coordinates of a second constellation point are $(\alpha_{i,2}, \beta_{i,2})$, then:

$$\mathrm{Re}\{u_p\} = \mathrm{Re}\{r_p\} - |H_p|^2 \frac{\alpha_{i,1} + \alpha_{i,2}}{2}$$

$$\mathrm{Im}\{u_p\} = \mathrm{Im}\{r_p\} - |H_p|^2 \frac{\beta_{i,1} + \beta_{i,2}}{2}$$

perform a binary phase shift keying (BPSK) demodulation on $u_p$ according to mapping relationships between constellation points in the quadrant i and modulation information, and obtain a received sequence Y corresponding to the sequence Y to be modulated of the transmitting end, wherein, $Y=(y_1, y_2, y_3, y_L)$; and a detecting unit, configured to perform reverse processing from the new control information B to the sequence Y on the sequence Y, and obtain received control information B.

19. The system of claim 17, wherein the hardware in the receiving end is further configured to perform steps in a following unit when executing the instructions stored in the non-transitory computer readable medium:
- a receiving unit, configured to receive a signaling transmitted by the transmitted end, wherein, the signaling carries a part of or all related information of the new control information B.

20. The system of claim 19, wherein,
the related information of the new control information B at least include related information of a corresponding control channel, information of length L, a rule for selecting pairing elements and a rule for mapping element groups to constellation points.

* * * * *